(12) United States Patent
Busbee et al.

(10) Patent No.: US 11,446,889 B2
(45) Date of Patent: Sep. 20, 2022

(54) 3D PRINTED CAGE STRUCTURES FOR APPAREL

(71) Applicant: Kornit Digital Technologies Ltd., Rosh HaAyin (IL)

(72) Inventors: Travis Alexander Busbee, Somerville, MA (US); David John Herman, Boston, MA (US)

(73) Assignee: Kornit Digital Technologies Ltd., Rosh HaAyin (IL)

( * ) Notice: Subject to any disclaimer, the term of this patent is extended or adjusted under 35 U.S.C. 154(b) by 355 days.

(21) Appl. No.: 16/245,832

(22) Filed: Jan. 11, 2019

(65) Prior Publication Data
US 2019/0248089 A1    Aug. 15, 2019

Related U.S. Application Data

(60) Provisional application No. 62/616,608, filed on Jan. 12, 2018.

(51) Int. Cl.
*B29D 35/12* (2010.01)
*B29D 99/00* (2010.01)
(Continued)

(52) U.S. Cl.
CPC ............ *B29D 35/126* (2013.01); *A41C 3/128* (2013.01); *A41C 5/00* (2013.01); *A43B 23/16* (2013.01); *A43D 8/006* (2013.01); *B29D 99/0064* (2013.01); *B32B 37/153* (2013.01); *B32B 38/145* (2013.01); *B32B 38/1866* (2013.01); *B29L 2031/4885* (2013.01); *B29L 2031/505* (2013.01); *B32B 2037/0092* (2013.01); *B32B 2305/18* (2013.01); *B32B 2437/00* (2013.01); *B32B 2437/02* (2013.01); *B33Y 10/00* (2014.12); *B33Y 80/00* (2014.12)

(58) Field of Classification Search
None
See application file for complete search history.

(56) References Cited

U.S. PATENT DOCUMENTS

| 7,560,399 B2 * | 7/2009 | Rock | D04B 1/04 |
| | | | 442/76 |
| 2014/0020191 A1 * | 1/2014 | Jones | A43B 23/0235 |
| | | | 12/142 R |

(Continued)

OTHER PUBLICATIONS

[No Author Listed], "5-axis 3D printing—Surface Conformal 3D Printing," YouTube, Jun. 10, 2015. Retrieved from https://www.youtube.com/watch?v=w8F18L4yk8M on Aug. 25, 2020. Supplemented by five .PNG images taken from video.

(Continued)

*Primary Examiner* — Shawn Mckinnon

(57) ABSTRACT

This application is generally directed to articles including cage structures and related systems and methods. The cage structures have utility in footwear and apparel (e.g., articles of clothing, braces, accessories). In some cases, the article is a footwear article. In some cases, the article is an article of apparel. In some embodiments, the article includes a textile. In some embodiments, the article includes a cage structure (e.g., comprising a polymer) attached to a substrate (e.g., a textile). In some embodiments, the interface of attachment between the substrate and the cage structure is substantially free of an adhesive.

9 Claims, 21 Drawing Sheets

(51) Int. Cl.

| | |
|---|---|
| *A43D 8/00* | (2006.01) |
| *A41C 5/00* | (2006.01) |
| *A41C 3/12* | (2006.01) |
| *A43B 23/16* | (2006.01) |
| *B32B 38/00* | (2006.01) |
| *B32B 38/18* | (2006.01) |
| *B32B 37/15* | (2006.01) |
| *B33Y 10/00* | (2015.01) |
| *B29L 31/50* | (2006.01) |
| *B29L 31/48* | (2006.01) |
| *B33Y 80/00* | (2015.01) |
| *B32B 37/00* | (2006.01) |

(56) References Cited

U.S. PATENT DOCUMENTS

| | | | |
|---|---|---|---|
| 2014/0101816 A1* | 4/2014 | Toronjo | A41D 31/02 2/69 |
| 2015/0101134 A1* | 4/2015 | Manz | G06F 30/00 12/142 R |
| 2015/0282564 A1* | 10/2015 | Meschter | A43D 25/00 36/45 |
| 2015/0321434 A1* | 11/2015 | Sterman | B33Y 10/00 264/255 |
| 2016/0135537 A1 | 5/2016 | Wawrousek et al. | |
| 2019/0037969 A1 | 2/2019 | Busbee et al. | |
| 2019/0039299 A1 | 2/2019 | Busbee et al. | |
| 2019/0039309 A1 | 2/2019 | Busbee et al. | |
| 2019/0039310 A1 | 2/2019 | Busbee et al. | |

OTHER PUBLICATIONS

[No Author Listed], "Micropen Medical: The Advantages of Micropenned Medical Devices," YouTube, Nov. 26, 2013. Retrieved from https://www.youtube.com/watch?v=h3WQUIKqvhU on Aug. 25, 2020. Supplemented by five .PNG images taken from video.

[No Author Listed], "New Stratasys 3D Demonstrators Build Bigger, Lighter Parts for Auto and Aero," Youtube, Aug. 24, 2016. Retrieved from https://www.youtube.com/watch?v=u pSEhF3q3Q on Aug. 25, 2020. Supplemented by five .PNG images taken from video.

[No Author Listed], "Omnifire 1000: Helmet Demonstration," YouTube, Jun. 22, 2016. Retrieved from https://www.youtube.com/watch?v=0SztvsnMeLE on Aug. 25, 2020. Supplemented by five .PNG images taken from video.

[No Author Listed], "Watch this Robot 3D Print a Building Out of Spray Foam," YouTube, Apr. 28, 2017. Retrieved from https://www.youtube.com/watch?v=Rgp4ncc1wOQ on Aug. 25, 2020. Supplemented by five .PNG images taken from video.

[No Author Listed], Pensar, Concept Project: DNA Shoe. https://pensar.com/?projects=dna-shoe-concept [last accessed Aug. 25, 2020].

* cited by examiner

400

3D PRINTED CAGE STRUCTURES FOR APPAREL

RELATED APPLICATIONS

This application claims priority to U.S. Provisional Application No. 62/616,608, filed Jan. 1, 2018, which is incorporated herein by reference in its entirety.

FIELD

This disclosure generally relates to articles for use in apparel, and in particular, to cage structures for use in apparel, and associated systems and methods.

BACKGROUND

The manufacture of biologically relevant structural support in footwear and apparel presents a challenge. The ability to prepare footwear, articles of clothing, braces, belts, and other articles of apparel with spatially varying properties to accommodate the complex motion of the wearer would provide benefits to both injured and well customers in everyday life. Improved systems and methods for preparing structurally supportive footwear and apparel are needed.

SUMMARY

The present invention generally relates to systems and methods involving cage structures for use in apparel. The subject matter of the present invention involves, in some cases, interrelated products, alternative solutions to a particular problem, and/or a plurality of different uses of one or more systems and/or articles.

In one aspect, the present disclosure is generally directed to an article. In some cases, the article is an article of apparel. In one set of embodiments, the article includes a substrate (e.g., textile, foam, polymer film). In some embodiments, the article includes a polymeric cage structure attached to the substrate. In some embodiments, the interface of attachment between the substrate and the polymeric cage structure is substantially free of an adhesive.

In another aspect, the present disclosure is generally directed to a method. In some cases, the method is a method of producing an article, e.g., an article of apparel. According to one set of embodiments, the method includes positioning a substrate (e.g., a textile) over a non-planar base. In some embodiments, the method includes printing a material onto the substrate. In some embodiments, the method includes allowing the material to solidify on the substrate such that the substrate is adhered to the material.

The method, in another set of embodiments, includes printing a polymeric structure directly onto the surface of a substrate (e.g., a textile). In some embodiments, printing comprises extrusion of a material from one or more nozzles to form the polymeric structure.

In another set of embodiments, the method includes printing a material onto a substrate (e.g., a textile). In some embodiments, the method includes applying a textile on top of the material. In some embodiments, the printed material acts as both an adhesive and a structural feature.

The method, in another set of embodiments, includes printing a material onto a region of a substrate (e.g., a textile) having a release feature. In some embodiments, the method includes removing the release feature from the substrate. In some embodiments, the method includes removing the release feature from the substrate, such that the material has at least a first portion adhered to a surface of the substrate, and at least a second portion not adhered to the surface of the substrate.

In one aspect, the present disclosure is generally directed to an article. In some cases, the article is a footwear article. In one set of embodiments, the footwear article includes a sole. In some embodiments, the footwear article includes an upper that extends upward from the sole. In some embodiments, the upper includes a substrate (e.g., a textile, a polymer film, a foam). In some embodiments, the upper includes a cage structure attached to the substrate (e.g., textile). In some embodiments, an interface of attachment between the substrate and the cage structure is substantially free of an adhesive.

The article (e.g., footwear article), in another set of embodiments, includes a substrate (e.g., a textile). In some embodiments, the article includes a gas-containing polymeric structure. In some cases, the article includes a second polymeric structure that encloses the gas-containing polymeric structure and attaches to the substrate of the article (e.g., footwear article).

In another aspect, the present disclosure is generally directed to a method. In some cases, the method is a method of producing an article, e.g., a footwear article. According to one set of embodiments, the method includes printing cavity walls, wherein the cavity walls include a polymer, onto a substrate. In some embodiments, the method includes providing a gas-containing polymeric structure on the substrate before and/or after printing the cavity walls. In some embodiments, the method includes printing one or more polymer layers (e.g., 2 polymer layers, 3 polymer layers, for polymer layers) to confine the gas-containing polymeric structure within the printed cavity walls.

The method, in another set of embodiments, includes printing a material onto a substrate (e.g., a textile). In some embodiments, the method includes applying a textile on top of the material.

In another set of embodiments, the method includes printing a material onto a region of a substrate (e.g., a textile) having a release feature. In some embodiments, the method includes removing the release feature from the substrate.

Other advantages and novel features of the present invention will become apparent from the following detailed description of various non-limiting embodiments of the invention when considered in conjunction with the accompanying figures.

BRIEF DESCRIPTION OF THE DRAWINGS

Non-limiting embodiments of the present invention will be described by way of example with reference to the accompanying figures, which are schematic and are not intended to be drawn to scale. In the figures, each identical or nearly identical component illustrated is typically represented by a single numeral. For purposes of clarity, not every component is labeled in every figure, nor is every component of each embodiment of the invention shown where illustration is not necessary to allow those of ordinary skill in the art to understand the invention. In the figures.

DETAILED DESCRIPTION

This application is generally directed to articles including cage structures and related systems and methods. The cage structures have utility in footwear and apparel (e.g., articles of clothing, braces, accessories). In some cases, the article is a footwear article. In some cases, the article is an article of apparel. In some embodiments, the article includes a substrate (e.g., textile, foam, polymer film). In some embodiments, the article includes a cage structure (e.g., comprising a polymer) attached to the substrate. In some embodiments, the interface of attachment between the substrate and the cage structure is substantially free of an adhesive.

The embodiments described above are by no means limiting and further embodiments are disclosed herein.

According to some embodiments of the disclosure, an article comprises a cage structure. In some embodiments, the cage structure comprises a cell 100 or a plurality of cells (see, e.g., FIG. 1). The cell in some cases comprises one or more elongate elements 110 and zero or more nodes 120 attached to one or more elongate elements (see, e.g., FIG. 1). In some embodiments, the cage structure is disposed on a substrate 130 (e.g., a textile; see, e.g., FIG. 1). The cage structure in some embodiments comprises a plurality of cells, wherein each cell comprises one or more elongate elements and zero or more nodes. In some embodiments, the cage structure comprises a plurality of elongate elements. In some embodiments, at least 2 of the cells and/or elongate elements intersect one another without a node. In some embodiments, at least 2 elongate elements intersect with one another. In some embodiments, the cage structure comprises elongate elements (e.g., bars, filaments) that do not intersect each other. In some embodiments, the cage structure comprises elongate elements, none of which intersect with one another. In some embodiments, without wishing to be bound by theory, the cage structure provides structural support for the substrate onto which the cage structure is printed (e.g., textile). In some embodiments, the substrate (e.g., the textile) is held in tension by the cage structure.

Figure 2:
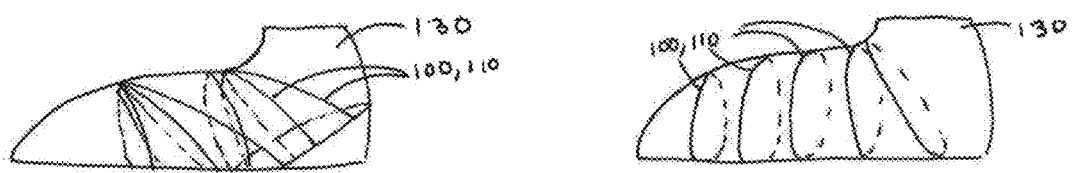
FIG. 2 illustrates non-limiting cage structures on footwear article uppers and/or footwear article soles, in accordance with some embodiments of the disclosure.

In some embodiments, each elongate element is a closed-loop structure (e.g., a hoop). In some embodiments, the elongate elements are printed features. In some embodiments, the cage structure comprises a plurality of cells, some of which cells each comprise a single elongate element in the form of a closed-loop structure. In some such embodiments, the cage structure comprises a plurality of cells (e.g., closed-loop structures) placed near one another and with at least two cells intersecting one another, or without any cells intersecting one another (e.g., in parallel to one another), surrounding a 3-dimensional substrate 130 (e.g., a textile, e.g., on a footwear article (e.g., shoe) last; see, e.g., FIG. 2). In FIG. 2, dotted lines mean that the cell or elongate element (e.g., the closed-loop shape) continues to contact the three dimensional substrate behind the plane of the page. In some embodiments, the cage structure comprises closed-loop elongate elements that form contours of a footwear article (e.g., shoe). A cell (e.g., an elongate element closed-loop structure) in some embodiments encloses a part of a footwear article (e.g., shoe). In such embodiments, a cell (e.g., an elongate element), some cells, or each cell encloses both a lace region of a footwear article (e.g., shoe) and a region of the footwear article that is under the foot when the footwear article is in use. In such embodiments, at least one elongate element encloses both a lace region of the footwear article and a region of the footwear article that is under the foot when the footwear article is in use.

In some embodiments, the elongate elements are connected by nodes to one another to form a cell. In some embodiments, the cells are connected to one another by nodes. The cage structure in some embodiments forms a lattice structure. In embodiments, the cage structure comprises an Auxetic structure. In some embodiments, the cage structure is Auxetic structure. The term Auxetic structure will be known to those of skill in the art and may refer to structures that have a negative Poisson's ratio. When stretched along at least one axis, an Auxetic structure becomes thicker in a direction perpendicular to the applied force.

Figure 1:
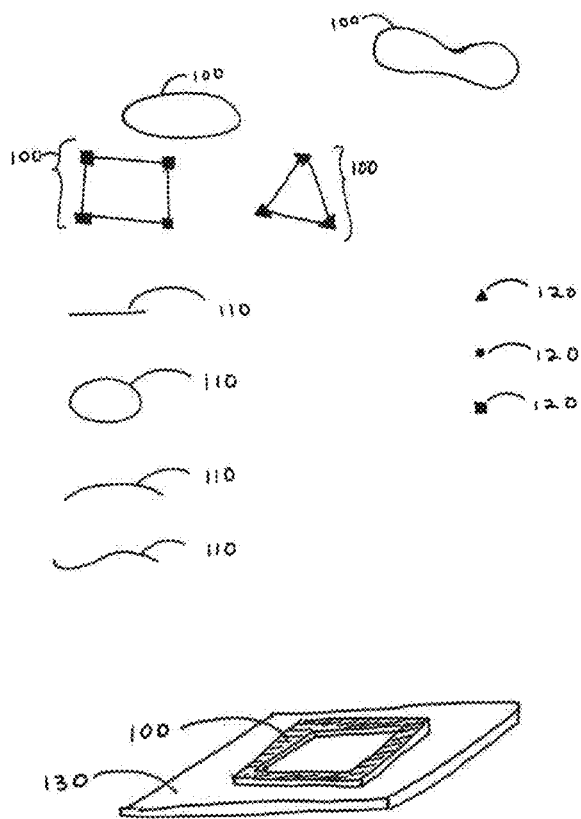
FIG. 1 illustrates non-limiting cage structures, in accordance with some embodiments of the disclosure.

An elongate element 110 in some embodiments is straight (e.g., linear, rectangular; e.g., forming a rectangular prism or cylinder) or curved (e.g., forming an arc, having an arbitrary curved shape), or a closed-loop shape, and has an aspect ratio of at least 1 (see, e.g., FIG. 1, FIG. 2). The meaning of the term aspect ratio will be known to those of ordinary skill in the art and may refer to the ratio of the length of the elongate element to the thickness (e.g., diameter, width) of the elongate element. In some embodiments, an elongate element has an aspect ratio between or equal to 0.01 and 10,000. In some embodiments, the thickness of the elongate element is between or equal to 1 micron and 10 cm (e.g., between or equal to 0.25 mm and 10 cm). A node 120 in some embodiments is in the form of a sphere, a cube, a pyramid, a polyhedron, or another suitable shape. The node may be an article, or the node may be a location of intersection between two or more elongate elements. The node may have an aspect ratio of between or equal to 0.01 and 10,000 (e.g., between or equal to 0.1 and 10).

The cell 100 may be in the form of one or more connected lines (e.g., comprising one or more linear elongate elements), a curve (e.g., comprising one or more curved elongate elements), a circle, an ellipsoid, a closed-loop curved shape, a triangle, a square, a pentagon, a hexagon, or any polygon. The cell may be in the form of a tetrahedron, a pyramid, a cube, rectangular prism, or another suitable polyhedron. The cell may be in the form of a sphere, an ellipsoid, or another suitable curved three-dimensional shape. The elongate elements may be arranged to form the cell shape by defining the sides of a polyhedron, polygon, circle, sphere, or other two-dimensional shape or three dimensional shape of the cell. The nodes may define the vertices of the cell, for example a polyhedron or polygon. The nodes may also serve as connectors between two or more cells (e.g., between a first cell and a second cell).

In some embodiments, an elongate element of the cage structure comprises a polymer. The polymer may comprise as non-limiting examples an elastomer, a thermoplastic, a thermoset, a polyurethane, a thermoplastic polyurethane, a polyurea, a silicone, an epoxy, a poly(ethylene-vinyl acetate), a polyester, a polypropylene, a polycarbonate, a polyamide, a polycarbonate, a polysulfone, a poly acrylate, polytetrafluoroethylene, vulcanized rubber, polystyrene, polyacrylonitrile, polychloroprene, a polyethylene, or polyvinyl chloride, or a combination thereof. In some embodiments, the elongate element comprises a metal. The metal may comprise as non-limiting examples steel, titanium, gold, silver, or iron. In some embodiments, the elongate element comprises naturally occurring material (e.g., wood).

In some embodiments, a node of the cage structure comprises a polymer. The polymer may comprise as non-limiting examples an elastomer, a thermoplastic, a thermoset, a polyurethane, a thermoplastic polyurethane, a polyurea, a silicone, an epoxy, a poly(ethylene-vinyl acetate), a polyester, a polypropylene, a polycarbonate, a polyamide, a polycarbonate, a polysulfone, a poly acrylate, polytetrafluoroethylene, vulcanized rubber, polystyrene, polyacrylonitrile, polychloroprene, a polyethylene, or polyvinyl chloride, or a combination thereof. In some embodiments, the node may comprise a metal. The metal may comprise as non-limiting examples steel, titanium, gold, silver, or iron. In some embodiments, the node comprises a naturally occurring material (e.g., wood). In some embodiments, the node comprises a same material as in the elongate element. In some embodiments, the node and the elongate element have a same material composition.

In some embodiments, the cage structure comprises a polyurethane thermoset, a polyurethane foam, a poly(ethylene-vinyl acetate) foam, an epoxy, or a silicone, or a combination thereof.

In some embodiments, one or more properties (e.g., compressive strength, elastic modulus) of the cage structure can be controlled by changing as non-limiting examples the shape of each elongate element 110, the aspect ratio of each elongate element 110, the length of each elongate element 110, the thickness of each elongate element 110, the material of each elongate element 110, the size (e.g., diameter, thickness) of each node 120, the material of each node 120, the shape of each node 120, the ratio of number of nodes to number of elongate elements, or the shape of each cell 100.

Figure 11:
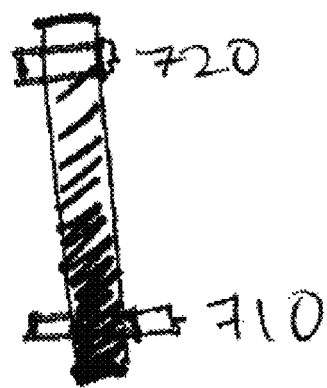
FIG. 11 illustrates a non-limiting example of an elongate element having a first portion and a second portion differing in at least one property, and with a gradient in at least one property along the length of the elongate element, in accordance with some embodiments of the disclosure.

In some embodiments, an elongate element comprises a first portion 710 having a first average value of at least one property (e.g., elastic modulus) and a second portion 720 having a second average value of at least one property (e.g. elastic modulus) that substantially differs from the first average value (see, e.g., FIG. 11). In some embodiments, the elongate element comprises a gradient in at least one property from one end of the elongate element to the other (see, e.g., FIG. 11). The term gradient will be known to those of ordinary skill in the art and may refer to a continuous change in a property along one or more dimensions of an article. In some embodiments, the elongate element comprises a gradient of at least one property along a single dimension. In some embodiments, the elongate element comprises a gradient of at least one property along two dimensions or along three dimensions.

Figure 12:
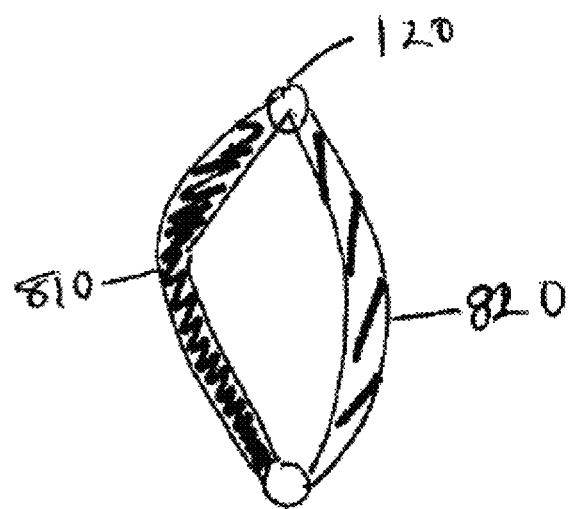
FIG. 12 illustrates a non-limiting example of a cage structure having an elastic elongate element and a viscous or viscoelastic elongate element in parallel and connected by nodes, in accordance with some embodiments of the disclosure.
Figure 13:
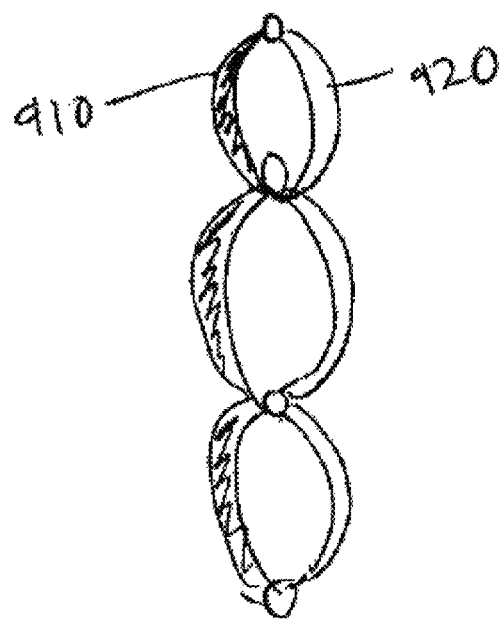
FIG. 13 illustrates a non-limiting example of a cage structure having a plurality of elastic elongate elements and a plurality of viscous elongate elements and/or viscoelastic elongate elements in parallel and connected by nodes, in accordance with some embodiments of the disclosure.
Figure 14:
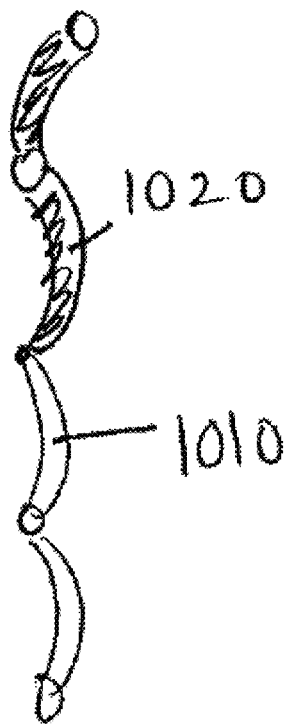
FIG. 14 illustrates a non-limiting example of a cage structure having a plurality of elongate elements with a first value of a property, and a plurality of elongate elements having a second value of a property different from the first value of the property, connected in series by nodes, in accordance with some embodiments of the disclosure.
Figure 19:
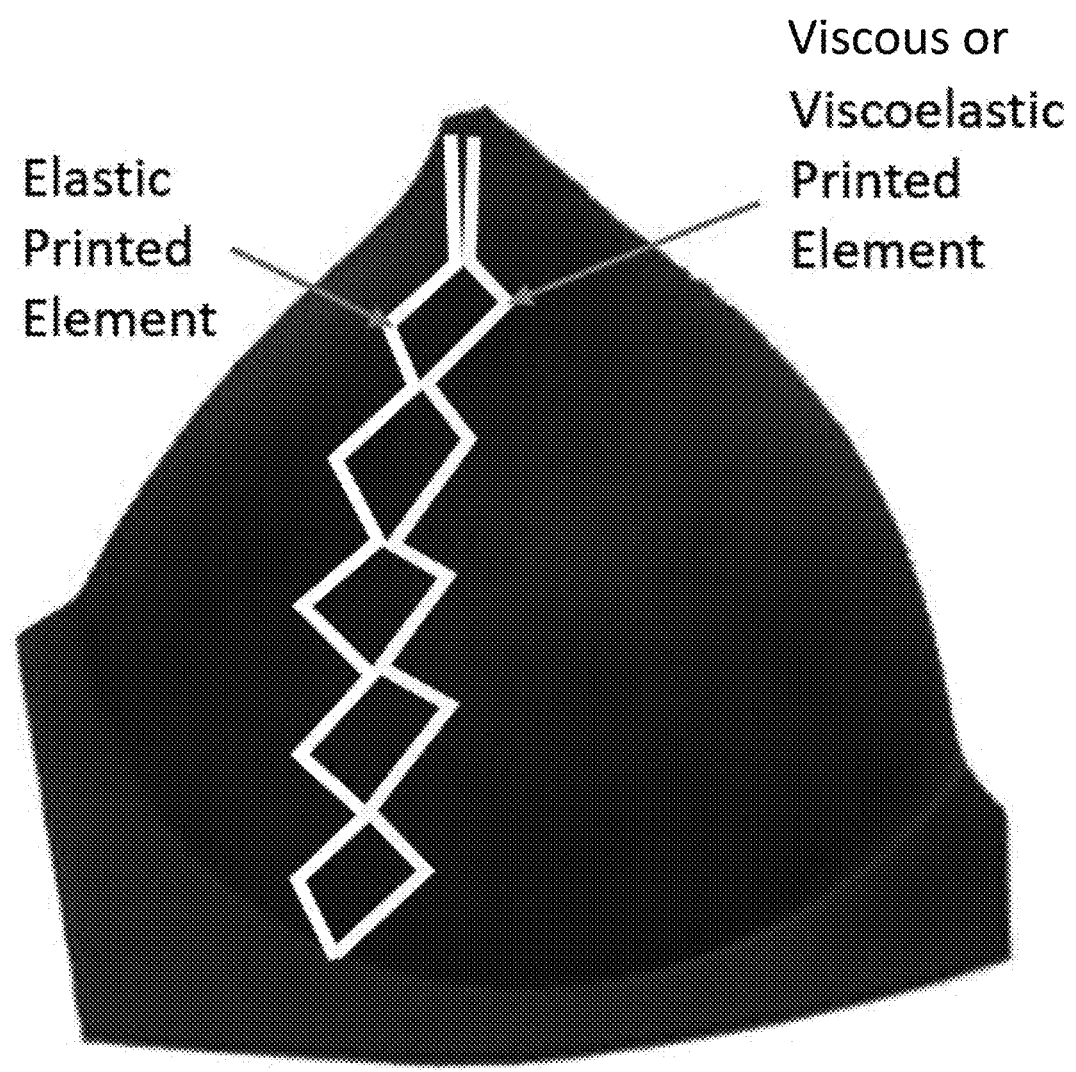
FIG. 19 illustrates a non-limiting example of an article comprising a bra cup having a cage structure comprising an elastic printed element and a viscous or viscoelastic printed element attached to the elastic printed element in parallel, in accordance with some embodiments of the disclosure.

In some embodiments, a cell comprises a first elongate element 810 having a first average value of at least one property (e.g., elastic modulus) and a second elongate element 820 having a second average value of at least one property (e.g., elastic modulus) (see, e.g., FIG. 12, FIG. 19). For example, the first elongate element may comprise an elastic printed element having an elastic modulus of between or equal to 0.1 MPa and 100 GPa, and the second elongate element may comprise a viscoelastic printed element having an elastic modulus of between or equal to 0.1 MPa and 100 GPa or a viscous printed element. In some embodiments, the cage structure comprises a first elongate element having a first average value of at least one property and a second elongate element having a second average value of at least one property arranged adjacent to or in series with one another and connected to one another by one or more nodes (see, e.g., FIG. 12). In some embodiments, a cage structure comprises a first plurality of elongate elements 910 having a first average value of at least one property (e.g., elastic modulus) and a second plurality of elongate elements 920 having a second average value of at least one property (e.g., elastic modulus) arranged adjacent to (e.g., in parallel with) the first plurality of elongate elements and connected by one or more nodes to at least one of the first plurality of elongate elements (see, e.g., FIG. 13). In some embodiments, the first plurality of elongate elements 1010 is arranged in series with the second plurality of elongate elements 1020 and connected by one or more nodes to at least one of the second plurality of elongate elements (see, e.g., FIG. 14).

In some embodiments, a difference in properties between a first portion and a second portion of the cage structure may comprise a gradient of one or more properties of the cage structure (e.g., the property or properties may vary relatively smoothly from a first value in the first portion to a second value in the second portion). In some embodiments, the cage structure comprises a gradient in stiffness between a first portion and a second portion. In other embodiments, there may be a sharp change in one or more of the properties at a boundary of one or more of the first portion and the second portion. In some embodiments, the article includes a cage structure having a gradient in one or more properties between a first portion and a second portion, wherein the cage structure comprises a single integrated material, and wherein the property or properties is/are e.g., color, average stiffness, average Shore A hardness, average pore size, pore concentration, average density, average hardness, average degree of cross-linking, average chemical composition, average largest dimension of particles (e.g., reinforcing particles), weight percent of particles (e.g., reinforcing particles), volume percent of particles (e.g., reinforcing particles), compression strength, slip resistance, abrasion resistance, heat deflection temperature, and/or coefficient of thermal expansion.

In certain embodiments, a printed article (e.g., cage structure) that comprises at least two portions may have a ratio of a property (e.g., stiffness, hardness, density, surface roughness, compression strength, slip resistance, abrasion resistance, heat deflection temperature, pore concentration, pore size, coefficient of thermal expansion) of the second portion of the printed article (e.g., cage structure) to the same property of the first portion of the printed article (e.g., cage structure) of greater than or equal to 1.05, greater than or equal to 1.1, greater than or equal to 1.2, greater than or equal to 1.3, greater than or equal to 1.5, greater than or equal to 2, or greater than or equal to 5. In some embodiments, a ratio of the property of the second portion of the printed article (e.g., cage structure) to the same property of the first portion of the printed article (e.g., cage structure) may be less than or equal to 10, less than or equal to 5, less than or equal to 2, less than or equal to 1.5, less than or equal to 1.3, less than or equal to 1.2, or less than or equal to 1.1. Combinations of the above-referenced ranges are also possible (e.g., greater than or equal to 1.05 and less than or equal to 10).

More systems and methods of printing articles with a gradient in one or more properties (e.g., using a nozzle) that can be applied to cage structures, and such articles that can be formed into cage structures, can be found in U.S. Provisional Patent Application Ser. No. 62/555,930, filed Sep. 8, 2017; and U.S. Provisional Patent Application Ser. No. 62/555,874, filed Sep. 8, 2017 each of which is incorporated herein by reference in its entirety.

Figure 6:
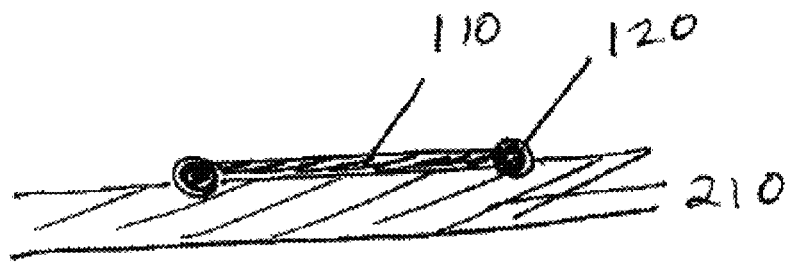
FIG. 6 illustrates a non-limiting article comprising 2 nodes, one elongate element, and a substrate, in accordance with some embodiments of the disclosure.
Figure 8:
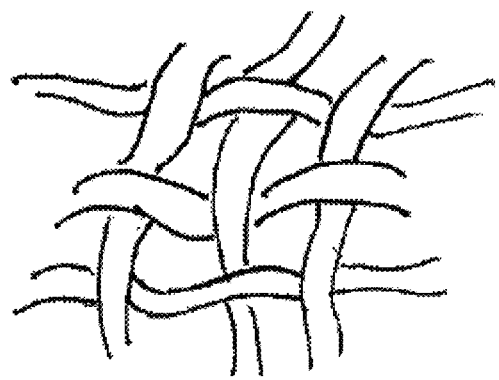
FIG. 8 illustrates non-limiting example of a portion of a woven textile or fabric, in accordance with some embodiments of the disclosure.
Figure 9:
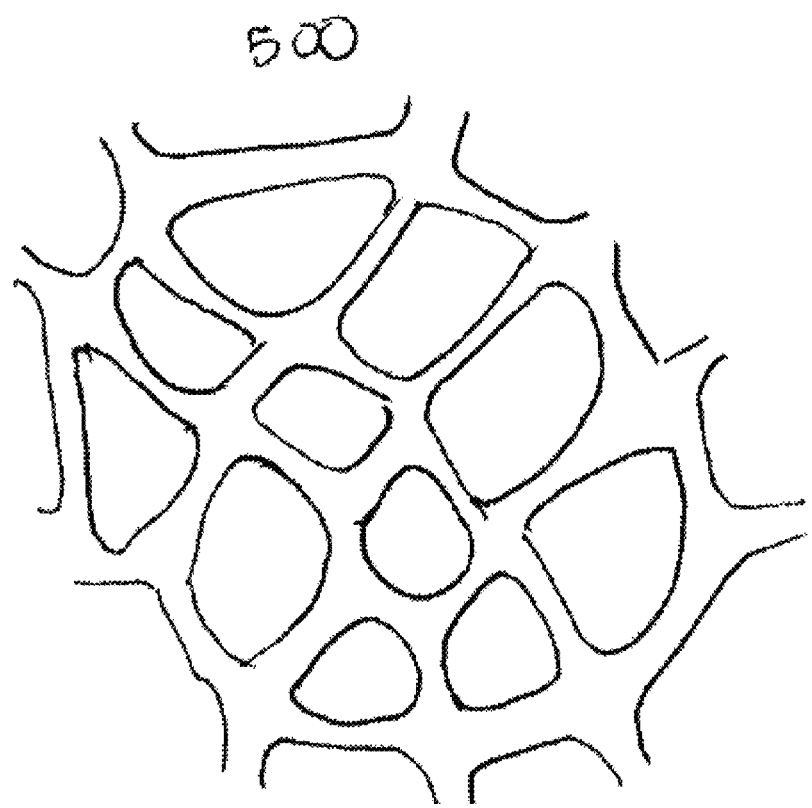
FIG. 9 illustrates a non-limiting example of a portion of a nonwoven textile, in accordance with some embodiments of the disclosure.

In some embodiments, at least a portion of the cage structure is attached to a substrate (e.g., a textile) 210 (see, e.g., FIG. 6). In some embodiments, the cage structure is adhered to a substrate (e.g., a textile) in the absence of a separate adhesive. In some embodiments, the cage structure both acts as a structural element (e.g., holding the substrate in a particular shape) and self-adheres to the substrate 210 (see, e.g., FIG. 7). In some embodiments, the textile comprises a nonwoven textile 500 (see, e.g., FIG. 9), a woven textile 400 (see, e.g., FIG. 8), a knit textile, or a combination thereof. In some embodiments, the textile comprises a fiber or a plurality of fibers in the case of a woven textile, or a nonwoven web or a plurality of nonwoven webs in the case of a nonwoven textile. In some embodiments, the textile comprises both a nonwoven textile and a woven textile. Further description of non-woven materials (herein referred to as nonwoven textiles) is provided in U.S. Provisional Patent Application Ser. No. 62/503,255, filed May 8, 2017, which is incorporated herein by reference in its entirety.

In some embodiments, the substrate (e.g., textile) is made at least in part from naturally occurring material (e.g., cotton, cellulose, silk) or synthetic material (e.g., a synthetic polymer, e.g., a polyester, a nylon, a polyether-polyurea copolymer such as spandex, expanded polytetrafluoroethylene). The substrate (e.g., textile) in some embodiments comprises a metal.

Figure 7:
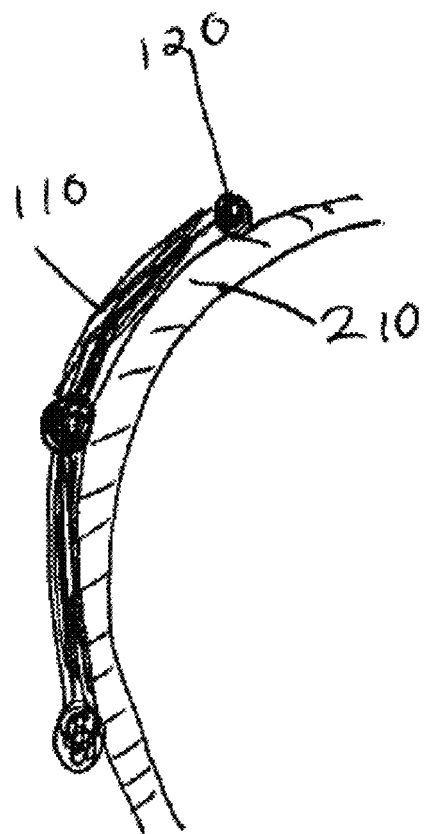
FIG. 7 illustrates a non-limiting article comprising 3 nodes, 2 curved elongate elements, and a curved substrate, in accordance with some embodiments of the disclosure.
Figure 10:
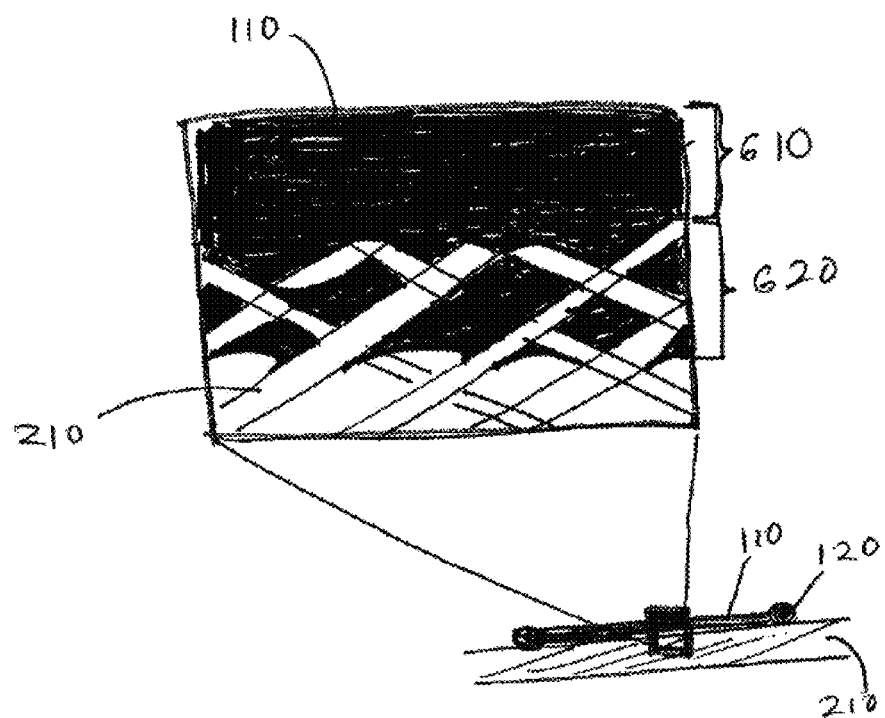
FIG. 10 illustrates a non-limiting example of an elongate element having a portion of its thickness interwoven with a woven textile, in accordance with some embodiments of the disclosure.

In some embodiments, at least one node of the cage structure is attached to the substrate (e.g., textile) (see, e.g., FIG. 6, FIG. 7). In some embodiments, at least one elongate element of the cage structure is attached to the substrate (e.g., textile) (see, e.g., FIG. 6, FIG. 7). In some embodiments, the substrate (e.g., textile) can be stretched in tension to between or equal to 0.1% strain to 1000% strain. In some embodiments, at least one property (e.g., elastic modulus) differs between the cage structure and the substrate (e.g., textile) such that the cage structure holds the substrate (e.g., textile) in place in a given shape or extent of stretching. As a non-limiting example, the ratio of the elastic modulus of the cage structure to the elastic modulus of the substrate (e.g., textile) may be at least 1.1, at least 1.2, at least 1.5, at least 1.8, at least 2, at most 3, at most 8, at most 10, at most 100, at most 1000, at most $1 \times 10^4$, at most $1 \times 10^5$, at most $1 \times 10^6$, at most $1 \times 10^7$, at most $1 \times 10^8$, or any combination of the above-referenced ranges. In some embodiments, at least a portion of the cage structure is interwoven (e.g., mechanically interwoven) with the substrate (see, e.g., FIG. 10). As a non-limiting example, the cage structure may have an elongate element where a first part of the thickness 610 of the elongate element 110 is outside of the textile and a second part of the thickness 620 of the elongate element 110 occupies some of the space between fibers of the textile, or occupies some of the negative space of a nonwoven web of the textile, or both (see, e.g., FIG. 10). In embodiments where the textile is a nonwoven textile, a part of the thickness of the elongate element or a part of the thickness of the node or both may occupy some of the negative space of the nonwoven web of the textile. In embodiments where the textile is a woven textile, a part of the thickness of the elongate element or a part of the thickness of the node or both may occupy some of the space between fibers of the textile. In embodiments where the textile comprises both a woven component and a nonwoven component, a part of the thickness of the elongate element or a part of the thickness of the node or both may occupy some of the space between the fibers of the textile, some of the negative space of the nonwoven web of the textile, or both.\

In one aspect, the present disclosure is generally directed to an article. In some cases, the article is a footwear article. In one set of embodiments, the footwear article includes a sole. In some embodiments, the footwear article includes an upper that extends upward from the sole. In some embodiments, the upper includes a substrate (e.g., textile). In some embodiments, the upper includes a cage structure attached to the substrate (e.g., textile). In some embodiments, an interface of attachment between the substrate (e.g., textile) and the cage structure is substantially free of an adhesive.

In some embodiments, an article (e.g., a footwear article) comprising a cage structure is provided. In some embodiments, the cage structure comprises a plurality of elongate elements. In some embodiments, at least 2 elongate elements (e.g., at least 2 elongate elements, at least 3 elongate elements, at least 4 elongate elements, at least 5 elongate elements, at least 10 elongate elements, at least 100 elongate elements) of the cage structure intersect with one another. In some embodiments, none of the elongate elements intersect with one another. In some embodiments, at least one elongate element encloses both a lace region of the footwear article and a region of the footwear article that is under a foot when the footwear article is in use. In some embodiments, the cage structure functions as a structural support for the upper. In some embodiments, the cage structure functions as a structural support for the upper, for a part of the midsole or for the entirety of the midsole, for a part of the outsole or for the entirety of the outsole, or a combination thereof.

In some embodiments, the article (e.g., footwear article) comprises a substrate (e.g., textile), e.g., to which a cage structure is directly attached. In some embodiments, the substrate comprises a textile, a foam, a polymer film, or a combination thereof. In some embodiments, the substrate (e.g., textile) is a sock. In some embodiments, the substrate (e.g., textile) is a footwear article (e.g., shoe) upper. In some embodiments, the textile comprises a woven textile, a nonwoven textile, a knit textile, or a combination thereof. In some embodiments, the substrate (e.g., textile) is held in tension by the cage structure.

In some embodiments, the article includes a gas-containing structure (e.g., a gas-containing polymeric structure, an air bag, a foam). In some cases, the article includes a second structure (e.g., polymeric structure) that encloses the gas-containing structure and attaches to the substrate (e.g., textile) of the article (e.g., footwear article). In some embodiments, the gas-containing structure comprises Nitrogen, Argon, Helium, or air, or any combination thereof. In some embodiments, the gas-containing structure is a stereolithography apparatus (SLA) printed lattice.

In some embodiments, the gas-containing structure (e.g., a gas-containing polymeric structure) comprises an air bag. In some cases, the gas-containing structure is an air bag. In some embodiments, the air bag is under pressure. In some embodiments, the air bag comprises a thermoplastic polyurethane. In some embodiments, the air bag comprises a plurality of layers (e.g., at least 2 layers, at least 3 layers, at least 4 layers, at least 5 layers, at least 10 layers) of polymer.

In some embodiments, the airbag comprises a multi-layer composite. In some embodiments, the gas-containing polymeric structure (e.g., the air bag) comprises many thin layers of polymer.

In some embodiments, the gas-containing polymeric structure comprises a foam. In some embodiments, the gas-containing polymeric structure is a foam. In some embodiments, the foam comprises a poly(ethylene-vinyl acetate), a polyurethane, a thermoplastic polyurethane, an expanded pellet foam of a thermoplastic polymer (e.g., an expanded polyurethane pellet foam), or a silicone, or any combination thereof. In some embodiments, the foam comprises crushed pieces or chunked pieces of any of the above-mentioned foams. The foam may comprise a foam disclosed in U.S. Provisional Patent Application Ser. No. 62/555,874, filed Sep. 8, 2017, which is incorporated herein by reference in its entirety, and a method of making said foam may be a method disclosed therein.

In some embodiments, a cage structure with a gradient in stiffness between a first region and a second region is provided. In some embodiments, a cage structure for a bra cup (e.g., that comprises an underwire for a bra) is provided. In some embodiments, a cage structure that covers at least a portion of a bra cup is provided. In some embodiments, the cage structure that comprises an underwire for a bra covers at least a portion of a bra cup. In some embodiments, the cage structure (e.g., that comprises an underwire) for a bra comprises a gradient in stiffness, wherein the stiffness of the cage structure is greater near the base of the cup (e.g., near the underwire) and the stiffness of the cage structure is less near the top of the bra cup. In some embodiments, the ratio of the stiffness of the cage structure from the base of the bra cup (e.g., near the underwire) to the top of the bra cup is any ratio of the property from the first portion (e.g., the base of the bra cup) to the second portion disclosed herein (e.g., the top of the bra cup), e.g., from 1 to 10, or from 2 to 10.

In some embodiments, a cage structure has at least one viscous elongate element or node, and/or at least one viscoelastic elongate element or node, and at least one elastic elongate element or node connected (e.g., in parallel), such that a viscoelastic property of the cage structure results along at least one axis (e.g., along at least one axis, along at least 2 axes, along at least 3 axes). In some embodiments, the at least one viscous elongate element or node and/or the at least one viscoelastic elongate element or node functions as a dampener. In some embodiments, the at least one elastic elongate element or node functions as continuous support. In some embodiments, the cage structure is provided on at least a portion of the bra cup. In some embodiments, a bra structure comprising a cage structure having at least two materials (e.g., at least 2 materials, at least 3 materials, at least 4 materials) is provided.

In some embodiments, a bra strap comprising a cage structure is provided. In some embodiments, the bra strap comprises an Auxetic structure that increases in thickness as more downward force is applied to the bra strap when in use by a wearer.

In some embodiments, a method for forming an article comprising a cage structure and a foam is provided. The method comprises, in some embodiments, printing a cage structure onto the inner surface of a mold. In some embodiments, the mold is a mold for a bra cup. In some embodiments, the cage structure comprises an underwire for a bra. In some embodiments, the cage structure is an underwire for a bra. The method may further comprise molding a foam into the cage structure and/or around the cage structure, such that the cage structure is integrated into the foam.

In some embodiments, an article of apparel comprising a cage structure is provided. In some embodiments, the article of apparel is an article of clothing (e.g., a pair of pants, a shirt). In some embodiments, the article of clothing is an article of compression clothing. In some embodiments, the cage structure of the article of apparel comprises a gradient in one or more properties (e.g., stiffness) along the contours of a generic body part for which the apparel is made (e.g., arm, leg, torso). In some embodiments, the cage structure of the article of apparel comprises a gradient in one or more properties (e.g., stiffness) along the contours of an individual person's body part for which the apparel is made.

In some embodiments, the substrate for a cage structure comprises a textile (e.g., a fabric). In some embodiments, a brace (e.g., an elbow brace, a knee brace, an ankle brace) comprising a cage structure is provided. In some embodiments, the brace comprises a fabric. The cage structure, in some embodiments, comprises a support structure with a gradient in stiffness between at least a first portion and a second portion of the support structure. In some embodiments, the cage structure of the brace comprises a gradient in stiffness between the edges of the brace and the center of the brace, e.g., to prevent discomfort that might otherwise result from an abrupt hard-soft interface that is absent from the cage structure, and to provide structural support for a joint of the wearer at the stiffer portion or portions.

In one aspect, the present disclosure is generally directed to an article. In some cases, the article is an article of apparel. In one set of embodiments, the article includes a substrate (e.g., textile). In some embodiments, the article includes a polymeric cage structure attached to the substrate (e.g., textile). In some embodiments, the interface of attachment between the substrate (e.g., textile) and the polymeric cage structure is substantially free of an adhesive.

In some embodiments, the cage structure comprises at least one elastic element and at least one viscous or viscoelastic element. In some embodiments, the cage structure comprises a plurality of elastic elements and a plurality of viscous elements and/or viscoelastic elements. Without wishing to be bound by theory, in some embodiments, the cage structure comprises elastic elements and viscous elements and/or viscoelastic elements such that the elastic elements provide constant support and the viscous elements and/or viscoelastic elements dampen mechanical oscillations. In some embodiments, the at least one elastic element and the at least one viscous element and/or the at least one viscoelastic element are arranged in parallel with respect to a primary loading axis (see, e.g., FIG. 12). In some embodiments, the elastic elements and the viscous elements and/or viscoelastic elements of a cage structure are arranged in parallel with respect to a primary loading axis (see, e.g., FIG. 13). In some embodiments, a viscoelastic behavior of the cage structure can be controlled by controlling the composition ratio of viscous elements and/or viscoelastic elements to elastic elements in the cage structure. For example, the viscoelastic behavior of the cage structure can be controlled by varying the composition of a polyurethane to a polyurea in the cage structure. In some embodiments, the viscoelastic behavior of the cage structure can be controlled by controlling the ratio of 2 or more components entering a mixing nozzle for printing of the cage structure in order to change the composition of the cage structure. In some embodiments, the cage structure (e.g., the printed structure, the polymeric cage structure) has a gradient in at least one property with respect to spatial location.

In some embodiments, a cage structure in direct contact with the surface of a substrate (e.g., any textile disclosed herein or in any disclosure herein incorporated by reference) that makes up an article of apparel, e.g., at least a piece of a bra, sports bra, shirt, pants, shorts, belt, sock, glove, suit, or footwear article (e.g., shoe) upper is provided. In some embodiments, the substrate (e.g., textile) is a portion of an article of apparel.

In some embodiments, the substrate (e.g., textile) comprises a footwear article (e.g., shoe) upper. In some embodiments, the cage structure (e.g., polymeric cage structure) forms a continuous or partial ring around at least a portion of the footwear article (e.g., shoe) upper. In some embodiments, the substrate (e.g., textile) is a portion of a bra. In some embodiments, the substrate (e.g., textile) is a portion of a bralette. In some embodiments, the substrate (e.g., textile) is a portion of a sports bra. In some embodiments, the substrate (e.g., textile) comprises one or more bra cups, wherein each bra cup has a substantially non-planar surface. In some embodiments, the cage structure (e.g., polymeric cage structure) functions as an underwire for a bra. In some embodiments, the underwire has a gradient in stiffness between a first portion of the underwire and a second portion of the underwire. Some embodiments of the disclosure are directed to building a supportive structure in a bra cup and/or a bra strap using viscoelasticity using viscous materials and/or viscoelastic materials with elastic materials in parallel (see, e.g., FIG. 19), which (without wishing to be bound by theory) may result in a bra cup that is slow to stretch in quick tension and will not over-strain; one or more gradient structures (see, e.g., FIG. 20), which results in a bra cup that is stronger near the base of the cup; one or more support features on a bra cup and a gradient underwire stronger in center (see, e.g., FIG. 21); or a combination thereof. In some embodiments, the underwire has a lower stiffness near the ends of the wire than near the center of the wire, and/or the underwire has a lower stiffness at a pressure point and a higher stiffness at other locations. In some embodiments, the underwire has a gradient change in stiffness from low stiffness to high stiffness to low stiffness from end to center to other end, respectively. In some embodiments, the stiffness of a cage structure (e.g., comprising polyurethane) printed onto a bra cup varies with the spatial location along the bra cup.

In some embodiments, the cage structure is on the concave side of the bra cup and comprises padding. In some embodiments, the substrate (e.g., textile) comprises a bra cup, and the cage structure comprises padding. In some embodiments, the padding is printed and is designed based on one or more measurements about a user. In some embodiments, the padding comprises a silicone. In some embodiments, the padding is printed as a 2 part silicone. In some embodiments, the padding is printed and/or comprises a thermosetting polyurethane or polyurethane foam. In some embodiments, the padding comprises a thermosetting polyurethane, or a polyurethane foam, or a combination thereof. In some embodiments, a thermosetting polyurethane padding is printed and/or has an isocyanate under indexed with respect to a polyol. In some embodiments, the padding has a gradient in one or more properties (e.g., stiffness). In some embodiments, the padding comprises one or more air bags. In some embodiments, the padding contains one or more air bags that enable the wearer to make adjustments throughout the lifetime of the bra. In some embodiments, the padding is directly bonded to a fabric portion of a bra cup.

In some embodiments, the cage structure is continuously connected between both an area of a bra cup and a shoulder strap of a bra that is attached to the bra cup. In some embodiments, the cage structure is continuously connected between both a bra cup and a shoulder strap attached to the bra cup. In some embodiments, the cage structure is continuously connected from one bra cup to another and to each shoulder strap, forming a continuous structure throughout one or more surfaces (e.g., an outer surface, an inner surface, and/or a surface covered on both sides) of the bra. In some embodiments, the cage structure (e.g., the polymeric cage structure) comprises an underwire and additional support around the bra cup that is connected to the underwire. In some embodiments, the textile is a bra, bralette, sports bra, a portion of a bra, a portion of a bralette, or a portion of a sports bra.

In some embodiments, the substrate (e.g., textile) is at least a portion of a shirt, pants, shorts, a belt, a sock, a suit, or a footwear article (e.g., shoe) upper. In some embodiments, the substrate (e.g., textile) is a shirt, pants, shorts, a belt, a sock, a suit, or a footwear article (e.g., shoe) upper.

In some embodiments, the cage structure is printed directly onto a substrate (e.g., textile). In some embodiments, the substrate (e.g., textile) is pretreated, e.g. with a plasma, in order to increase adhesion to the material to be printed (e.g., the cage structure). In some embodiments, the substrate (e.g., textile) is not pretreated. The cage structure in some embodiments is printed onto a substrate (e.g., textile) in the form of a fluid. The printed fluid may be allowed to solidify after having been printed onto the substrate (e.g., textile). In some cases (e.g., where the substrate comprises a woven textile, where the substrate comprises a nonwoven textile, where the substrate comprises a foam), at least a portion of the printed fluid is wicked into the substrate through capillary action, such that when the printed fluid solidifies into the cage structure, at least a portion of the cage structure is mechanically interwoven with the substrate. In some embodiments, the printed fluid remains on the surface of the substrate during solidification of the printed fluid to form the cage structure.

In some embodiments, a method of producing an article (e.g., a footwear article) is provided. The method may comprise printing a material onto one or more portions (e.g., regions) of a substrate (e.g., textile) having a release feature (e.g., at least 1 portion, at least 2 portions, at least 3 portions, at least 4 portions, at least 10 portions, at least 100 portions). The method may comprise printing the material onto one or more portions of the substrate that is/are free of the release feature (e.g., at least 1 portion, at least 2 portions, at least 3 portions, at least 4 portions, at least 10 portions, at least 100 portions). The method may comprise printing the material such that the regions/regions of material in contact with the release feature is/are continuous with the regions/regions of material not in contact with the release feature (e.g., in direct contact with the substrate). The method may comprise printing the material such that region/regions in contact with the release feature and the region/regions not in contact with the release feature alternate. In some embodiments, the material printed onto the release feature (e.g., released material) is not bound to the release feature or the substrate, but the material adjacent to the release feature and continuous with the material printed onto the release feature connects the released material to the substrate. The method may further comprise removing the release feature from the substrate (e.g., textile).

In some embodiments, a release feature comprises e.g., a release paper, a release spray, or a release ink, or a combination thereof. In embodiments where the release feature comprises a release paper, which had been placed onto at least a portion (e.g., region) of the substrate, the method of producing the article may comprise removing the release paper from the substrate (e.g., textile) after printing a material onto at least one region of the substrate comprising the release feature. A release spray may comprise a thin coating that has been sprayed onto at least a portion of a substrate (e.g., footwear article (e.g., shoe), textile) that prevents bonding of a material to the substrate. In some cases, the release spray remains on the substrate of the finished article (e.g., on the textile of a footwear article (e.g., shoe) upper). In some embodiments, a release ink may comprise a thin coating that has been printed (e.g., 3D printed) onto at least a portion of a substrate (e.g., footwear article (e.g., shoe), textile) that prevents bonding of a material to the substrate. The release ink may have been extruded through a nozzle in order to print onto the at least one portion of the substrate.

In some embodiments, methods of manufacture of a cage structure are provided. In some embodiments, the cage structure is printed (e.g., 3D printed). In some embodiments, printing comprises extrusion of a material through a nozzle (e.g., a mixing nozzle comprising a mixing chamber and an impeller) onto a substrate (e.g., a textile) to form the cage structure. In some embodiments, the mixing nozzle is in direct fluid communication with the substrate for at least a portion of the printing process. In some embodiments, printing comprises extrusion of a material from one or more nozzles (e.g., at least 2 nozzles, at least 3 nozzles, at least 4 nozzles, at least 5 nozzles).

In some embodiments, printing comprises flowing two or more reactive species (e.g., at least 2, at least 3, at least 4 species) into a mixing nozzle that react during mixing or after mixing and upon application of energy (e.g., heat, light) to form a solid cage structure on the substrate.

In some embodiments a multi-axis system for printing a cage structure is provided. In some embodiments the multi-axis system comprises a print head comprising a printing nozzle (e.g., a microfluidic printing nozzle). In some embodiments, the multi-axis system comprises two inlets to the printing nozzle. In some embodiments, multi-axis system comprises a substrate. In some embodiments, the print head is configured to deposit a material onto the substrate. In some embodiments, the substrate is configured to be rotated around at least one axis and translated along at least one axis.

In some embodiments, printing comprises utilizing location control (e.g., using a gantry system) of a printing nozzle for translation and/or rotation along at least one axis (e.g., at least one axis, at least 2 axes, at least 3 axes, at least 4 axes, at least 5 axes) to move the printing nozzle relative to a substrate of any curvature in order to maintain distance and orientation from the substrate when printing a material by extrusion through the printing nozzle. In some embodiments, a sensor of the substrate may be coupled to an actuator that communicates with a controller to actuate movement of the printing nozzle relative to the substrate in order to maintain distance and orientation from the substrate when printing a material by extrusion through the printing nozzle. Some embodiments, the substrate may be fitted with location control (e.g., using a gantry system) to move the substrate relative to the printing nozzle with translation and/or rotation along at least one axis (e.g., at least one axis, at least 2 axes, at least 3 axes, at least 4 axes, at least 5 axes) in order to maintain distance and orientation from the printing nozzle when printing a material onto the substrate by extrusion through the printing nozzle. In some embodiments, a sensor of the substrate may be coupled to an actuator that communicates with a controller to actuate movement of the substrate relative to the printing nozzle in order to maintain distance and orientation from the printing nozzle when printing a material onto the substrate by extrusion through the printing nozzle.

A variety of 3D-printing techniques are known to those of ordinary skill in the art, and include, but are not limited to, additive manufacturing techniques such as direct ink writing (DIW), stereolithography (SL), fused deposition modeling (FDM), laser sintering, laminated object manufacturing (LOM), doctor blading, material spraying, and material jetting. In some embodiments, for example, 3D-printing comprises depositing a first material in a first layer via additive manufacturing, removing at least some material in the first layer via subtractive manufacturing, and after removing the at least some material in the first layer, depositing a second material in the first layer via additive manufacturing. In some embodiments, additive manufacturing comprises at least one member selected from the group consisting of: direct ink writing (DIW), stereolithography (SL), fused deposition modeling (FDM), laser sintering, laminated object manufacturing (LOM), doctor blading, material spraying, and material jetting. In some embodiments, subtractive manufacturing comprises at least one member selected from the group consisting of: milling, drilling, cutting, etching, grinding, sanding, planing, and turning.

In some embodiments, 3D-printing comprises receiving, by a processing device, a 3D model of an object to be printed; receiving, by the processing device, information including at least one material property of a material to be 3D-printed; and generating, by the processing device, a set of sensor-based printer control parameters to print the object based, at least in part, on the sensor input. In some implementations, the processing device is further adapted to execute instructions for initiating 3D-printing of the object in the 3D-printer; receiving, during 3D-printing, the input from the sensor associated with the 3D-printing; and adjusting at least one printing property based on the sensor input. In some variations, the sensor is a force probe, a weight sensor, an optical camera, an imaging device, an in-line imaging device, a profilometer, a laser measurement device, a 3D scanner, or an automatic digital multimeter.

In another non-limiting implementation, 3D-printing includes obtaining model data representing a 3D model of an object. This implementation also includes processing the model data to generate a set of commands to direct a 3D-printer to extrude a material to form a physical model associated with the object. The set of commands is executable to cause an extruder (e.g., comprising a mixing nozzle) of the 3D printer to deposit a first portion of the material corresponding to a first portion of the physical model, to clean, to purge, or to clean and purge the extruder after depositing the first portion of the material, and to deposit a second portion of the material after cleaning the extruder. The second portion of the material corresponds to a second portion of the physical model.

More systems and methods of printing (e.g., using a nozzle), printing with reactive species, and multi-axis printing that can be applied to printing cage structures, and printed articles that can be formed into cage structures, can be found in U.S. Provisional Patent Application Ser. No. 62/555,874, filed Sep. 8, 2017, which is incorporated herein by reference in its entirety.

In some embodiments, methods of making articles comprising cage structures and a foam and/or air bag are provided.

Figure 4:
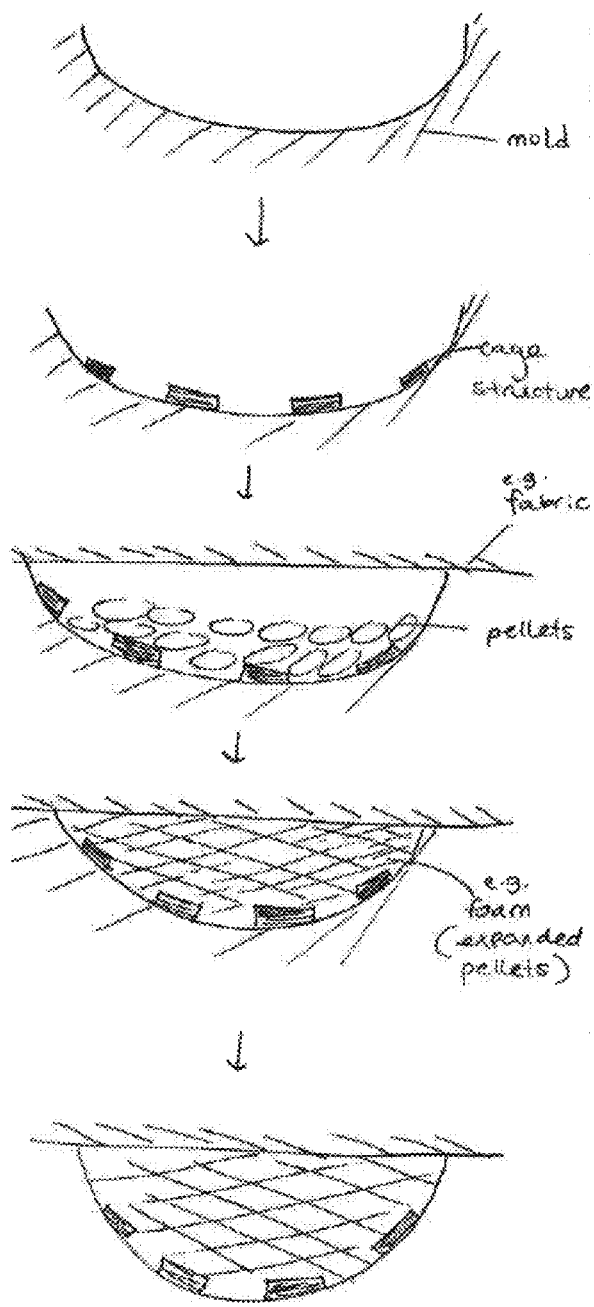
FIG. 4 illustrates a non-limiting method for embedding a cage structure into a foam and attaching said cage structure to a substrate (e.g., a textile), in accordance with some embodiments of the disclosure.

In some embodiments, the method comprises printing a cage structure onto the inner surface of a mold, then molding a foam into/around the cage structure, such that the cage structure is integrated into the foam. In some embodiments, molding the foam comprises placing one or more pellets comprising a chemical blowing agent onto the cage structure. In some embodiments, the one or more pellets comprising a chemical blowing agent expand by at least a factor of 2 (e.g., by a factor of 2, by a factor of 4, by a factor of 6, by factor of 8, by factor of 10) from its/their original size. In some embodiments, the one or more pellets comprising a chemical blowing agent expand by a factor of 6 from its/their original size. In some embodiments, the method comprises printing a cage structure onto a mold. In some embodiments, the method comprises placing one or more pellets comprising a chemical blowing agent into the mold with the printed cage structure. In some embodiments, the method comprises placing a fabric over the mold. In some embodiments, the method comprises activating the expansion of the pellets in the mold (e.g., to form a foam) using an activation method (e.g., heat, light). In some embodiments, the pellets occupy a larger fraction of the mold by volume than that required to fill the mold upon expansion of the pellets. As a non-limiting example, the mold may be halfway filled with pellets that can expand by a factor of 6 from their original size. In some embodiments, upon expansion of the pellets, the foam formed bonds to both the fabric covering the mold and the cage structure (see, e.g., FIG. 4). In some embodiments, the method comprises printing a cage structure, placing an air bag onto the cage structure, and then molding a foam around the cage structure and air bag. In some embodiments, the method comprises printing a cage structure into a mold before introducing pellets with blowing agent and expanding the pellets into a foam, e.g., to form at least a portion of a footwear article (e.g., shoe) sole.

In some embodiments, a method comprises printing a cage structure onto a foam or air bag. In some embodiments, the method comprises printing a cage structure onto a foam, e.g., to form at least a portion of a footwear article (e.g., shoe) sole. In some embodiments, an airbag associated with a footwear article (e.g., shoe) sole may be used as the three-dimensional substrate on which the cage structure is printed. Without wishing to be bound by theory, the cage structure may house the airbag to provide stability and prevent the airbag from expanding non-uniformly.

Figure 5:
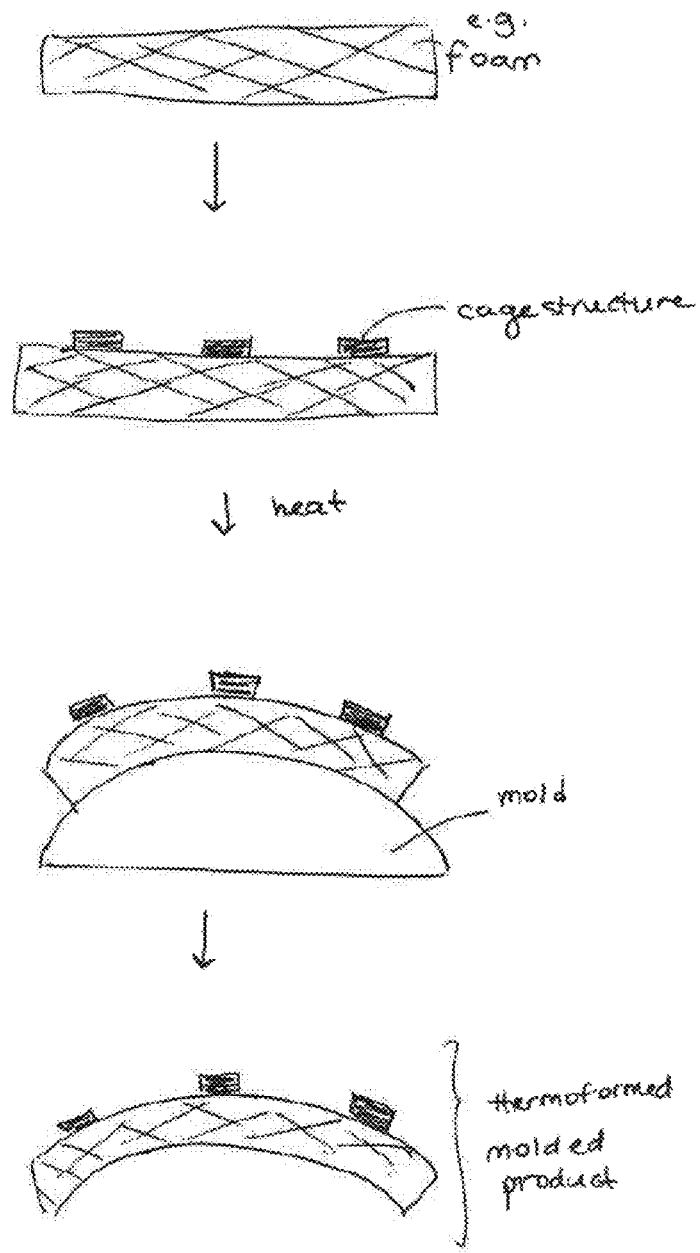
FIG. 5 illustrates a non-limiting method for producing a thermoformed foam with a cage structure printed onto it, in accordance with some embodiments of the disclosure.

In some embodiments, a method comprises printing a cage structure onto a piece of foam (e.g., in a flat geometry). In some embodiments, the method comprises thermoforming the article comprising the cage structure printed onto the foam, wherein thermoforming comprises heating the article and shaping it to conform to the shape of the mold and to result in the thermoformed molded product (see, e.g., FIG. 5). In some embodiments, the method comprises printing a cage structure directly onto a flat piece of foam, and then thermoforming the foam to shape the caged foam piece, or using other existing manufacturing techniques to shape the caged foam piece.

In some cases, the method is a method of producing an article, e.g., a footwear article.

Figure 3:
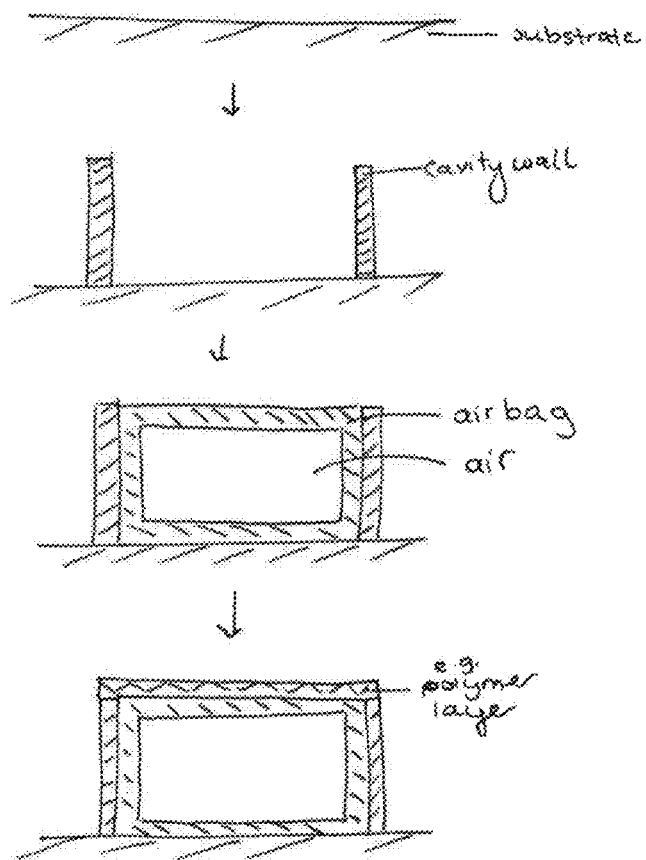
FIG. 3 illustrates a non-limiting method for enclosing an air bag with a cage structure, in accordance with some embodiments of the disclosure.

According to one set of embodiments, the method includes printing cavity walls, wherein the cavity walls include a polymer, onto a substrate (see, e.g., FIG. 3).

In some embodiments, the method includes providing a gas-containing structure (e.g., a gas-containing polymeric structure) on the substrate before and/or after printing the cavity walls (see, e.g., FIG. 3).

In some embodiments, the method includes printing one or more polymer layers (e.g., 2 polymer layers, 3 polymer layers, for polymer layers) to confine the gas-containing structure within the printed cavity walls (see, e.g., FIG. 3).

According to one set of embodiments, the method includes printing cavity walls, wherein the cavity walls include a polymer, onto a substrate; then providing a gas-containing structure on the substrate before after printing the cavity walls; then printing one or more polymer layers (e.g., 2 polymer layers, 3 polymer layers, for polymer layers) to confine the gas-containing structure within the printed cavity walls (see, e.g., FIG. 3). In some embodiments, an air bag is inserted onto the substrate after printing the cavity walls.

According to one set of embodiments, the method includes providing a gas-containing structure on the substrate before printing the cavity walls; printing cavity walls, wherein the cavity walls include a polymer, onto a substrate; then printing one or more polymer layers (e.g., 2 polymer layers, 3 polymer layers, for polymer layers) to confine the gas-containing structure within the printed cavity walls. In some embodiments, a foam is formed onto the substrate before printing the cavity walls.

In some embodiments, providing a gas-containing polymeric structure comprises printing the gas-containing polymeric structure using a stereolithography apparatus. In some embodiments, providing the gas-containing polymeric structure comprises directly printing a polymeric precursor to the gas-containing polymeric structure, comprising a chemical blowing agent, and activating the chemical blowing agent. In some embodiments, the chemical blowing agent is activated after printing the polymeric precursor. In some embodiments, the chemical blowing agent is activated during printing of the polymeric precursor. In some embodiments, the chemical blowing agent is activated during and/or after printing the polymeric precursor. In some embodiments, the method comprises activating the chemical blowing agent by heating the polymeric precursor above the activation temperature of the chemical blowing agent by at least 1 degree Celsius.

In some embodiments, for a footwear article comprising a gas-containing structure and/or a cage structure, a structure that is printed is more rigid on a surface facing the outside of a footwear article (e.g., shoe) (e.g., outward to the left or outward to the right when in use) than on a surface facing the inside of the footwear article (e.g., shoe) (e.g., facing the other footwear article (e.g., shoe) when in use).

In some embodiments, the gas-containing structure is measured by one or more sensors during and/or after providing the gas-containing structure. In some embodiments, a movement path for a deposition nozzle that is printing a cage structure onto and/or around the gas-containing structure is modified or fabricated based on feedback from the one or more sensors. In some embodiments, a retaining device is used to hold the gas-containing structure in a fixed location temporarily as the cage structure is deposited onto or around the gas-containing structure. In some embodiments, the retaining device is utilized to compensate for any change in shape of the gas-containing structure, for example during expansion of the gas-containing structure upon activation of a chemical blowing agent contained in the gas-containing structure. In some embodiments, a method of making an article (e.g., a footwear article) is provided. The method may comprise printing cavity walls onto a substrate. In some embodiments, the cavity walls comprise a polymer. In some embodiments, the method further comprises providing an air-containing structure on the substrate before or after printing the cavity walls. The air-containing structure may be an air-containing polymeric structure. In some embodiments, the method comprises printing one or more layers (e.g., comprising a polymer) to confine the air-containing structure within the printed cavity walls.

The method, in another set of embodiments, includes printing a material onto a substrate (e.g., textile). In some embodiments, the method includes applying a textile on top of the material. In some embodiments, the method includes printing a material onto a substrate (e.g., textile) and subsequently applying a textile directly to the top of the material. In some embodiments, the material is printed onto the substrate (e.g., textile) in a continuous process. In some embodiments, the substrate (e.g., textile) is a portion of a footwear article (e.g., shoe) upper. In some embodiments, the method comprises printing a material onto a portion of a footwear article (e.g., shoe) upper end of then applying a textile directly on top of the printed material.

In some embodiments, the cage structure is printed onto the substrate in a continuous process. In some embodiments, the cage structure may be printed onto at least a portion of an upper, a midsole, and/or an outsole of a footwear article (e.g., shoe). In some embodiments, the cage structure is printed onto an upper, a midsole, and/or an outsole of a footwear article (e.g., shoe) in a continuous process.

In another set of embodiments, the method includes printing a material onto a region of a substrate (e.g., textile) having a release feature (e.g., a release paper). In some embodiments, the method includes removing the release feature from the substrate (e.g., textile). In some embodiments, the method involves printing a material onto a region of a substrate (e.g., textile) having a release feature and then removing the release feature from the substrate (e.g., textile).

In some cases, the method is a method of producing an article, e.g., an article of apparel. According to one set of embodiments, the method includes positioning a substrate (e.g., textile) over a non-planar base. In some embodiments, the method includes printing a material onto the substrate (e.g., textile). In some embodiments, the method includes allowing the material to solidify on the substrate (e.g., textile) such that the substrate is adhered to the material. In some embodiments, the method involves positioning a substrate over a non-planar base, then printing a material onto the substrate, followed by allowing the material to solidify on the substrate such that the substrate is adhered to the material. In some embodiments, the method comprises printing a material onto a substrate, then positioning the substrate over a non-planar base, followed by allowing the material to solidify on the substrate such that the substrate is adhered to the material.

In some embodiments, printing comprises extrusion of the material from a reactive mixing chamber comprising at least 2 inputs. In some embodiments, the cage structure (e.g., the polymeric cage structure) is made by extruding a material from a reactive mixing chamber having at least 2 inputs. In some embodiments, a method for printing a cage structure (e.g., a polymeric cage structure) by extrusion from one or more nozzles is provided. In some embodiments, the method comprises extruding one or more materials from the nozzle and onto a substrate, e.g., a woven, knit, or non-woven textile. In some embodiments, the method comprises bonding the cage structure to the substrate (e.g., textile) without the use of an adhesive. In some embodiments, the substrate (e.g., the textile) is a piece of apparel. The method, in another set of embodiments, includes printing a polymeric structure directly onto a substrate, e.g., a surface of a textile. In some embodiments, printing comprises extrusion of a material from one or more nozzles to form the polymeric structure.

In some embodiments, the material (e.g., the cage structure) having been deposited onto the substrate (e.g., textile) causes a permanent change in the resting structure of the substrate onto which the material was printed. As a non-limiting counterexample, without the methods of the instant disclosure, a small sock could be stretched over a footwear article (e.g., shoe) last, and upon removal from the footwear article (e.g., shoe) last, the sock would shrink back to approximately its original size. With a process of the instant disclosure, the sock could be stretched over the last, followed by printing a material (e.g., a cage structure) onto the sock and allowing the material to solidify. Then, when the sock/material composite is removed from the last, the sock largely retains the shape of the last because the material holds the substrate (e.g., textile) stretched in tension. Further description of lasts, footwear lasts, and non-woven materials is provided in U.S. Provisional Patent Application Ser. No. 62/503,255, filed May 8, 2017, which is incorporated herein by reference in its entirety.

In some embodiments, printing comprises modulating a printing tool path and one or more parameters of the one or more nozzles based on feedback from one or more sensors. In some embodiments, printing comprises maintaining one or more nozzles, through which one or more materials are extruded to print the one or more materials, at a constant angle relative to the substrate normal direction. The term "normal direction" will be known to those skilled in the art and may refer to the direction perpendicular to the tangential plane of an object (e.g., substrate) at a specified location along the surface of the object. In some embodiments, the non-planar base is connected to one or more motors that can translate and/or rotate the substrate with respect to the nozzle (e.g., through which material is extruded onto the substrate during printing). In some embodiments, the nozzle is connected to one or more motors that can translate and/or rotate the nozzle with respect to the non-planar base. In some embodiments, printing comprises rotating and/or translating the nozzle relative to the non-planar base such that the material is extruded spatially normal to the non-planar base. In some embodiments, printing comprises rotating and/or translating the non-planar base relative to the nozzle such that the material is extruded spatially normal to the non-planar base. In some embodiments, printing comprises rotating the substrate relative to the nozzle and/or rotating the nozzle relative to the substrate along at least one rotational axis (e.g., 1 rotational axis, 2 rotational axes, 3 rotational axes, 4 rotational axes, or 5 rotational axes). In some embodiments, printing comprises translating the nozzle relative to the substrate and/or translating the substrate relative to the nozzle along at least one translational axis (e.g., 1 translational axis, 2 translational axes, 3 translational axes, 4 translational axes, or 5 translational axes). In some embodiments, printing comprises coordinated motion of the nozzle and the substrate along 2 or more axes, wherein some of the axes are translational axes and some of the axes are rotational axes. (e.g., 1 rotational axis, 2 rotational axes, 3 rotational axes, 4 rotational axes, or 5 rotational axes; e.g., 1 translational axis, 2 translational axes, 3 translational axes, 4 translational axes, or 5 translational axes).

In some embodiments, the substrate (e.g., textile) (e.g., for the piece of apparel) is positioned over and/or fixed to a non-planar base, for example a non-planar backing or fixture. In some embodiments, the non-planar base is a portion of a mannequin, for example a bust or a wrist. In some embodiments, the non-planar base is a footwear article (e.g., shoe) last. In some embodiments, the non-planar base is the equivalent of a footwear article (e.g., shoe) last but for other wearables. In some embodiments, the substrate (e.g., textile) is fixed to a non-planar base that has been directly modeled for an individual wearer. In some embodiments, positioning the substrate (e.g., textile) over a non-planar base comprises fixing the substrate to a portion of a mannequin. In some embodiments, the substrate is secured to the non-planar base during printing and/or during solidification of the material that was printed onto the substrate. In some embodiments, the non-planar base represents the desired shape of at least one of the surfaces of the article of apparel (e.g., the garment of clothing).

In some embodiments, the method comprises modeling a non-planar base for an individual wearer. In some embodiments, a relevant portion of the individual wearer is scanned (e.g., a foot in a process of making a footwear article, a wrist in a process of making a watch or bracelet, or a bust in a process of making a bra), and a computer receives the spatial data obtained from the scan. A computer-implemented method in some embodiments converts this data into instructions for a printer or other manufacturing instrumentation in order to produce an individualized non-planar base onto which the substrate (e.g., textile) is placed and/or around which the substrate is stretched. In some embodiments, the method comprises scanning a relevant portion of the individual wearer using a scanner and manufacturing the non-planar base from spatial data obtained from scanning to replicate the shape of the individual wearer.

In some embodiments, the mechanical properties of the cage structure (e.g., the polymeric cage structure) and/or the shape of the cage structure are programmatically generated based on data recorded about a specific person. In some embodiments, the cage structure is designed programmatically based on one or more measurements of a specific individual.

The method, in another set of embodiments, includes printing a polymeric structure directly onto the surface of a substrate (e.g., textile). In some embodiments, printing comprises extrusion of a material from one or more nozzles to form the polymeric structure. In some embodiments, the method comprises bonding the polymeric structure directly to the surface of the substrate (e.g., textile) without the use of an adhesive. In some embodiments, the surface of the substrate has a substantially non-planar shape during printing of the polymeric structure. In some embodiments, the method comprises wrapping the substrate around a footwear article (e.g., shoe) last before printing.

In another set of embodiments, the method includes printing a material onto a substrate (e.g., textile). In some embodiments, the method includes applying a textile on top of the material. In some embodiments, the printed material acts as both an adhesive and a structural feature. In some embodiments, the surface of the substrate (e.g., textile) has a substantially non-planar shape during printing of the polymeric structure.

The method, in another set of embodiments, includes printing a material onto a region of a substrate (e.g., textile) having a release feature. In some embodiments, the method includes removing the release feature from the substrate. In some embodiments, the method includes removing the release feature from the substrate, such that the material has at least a first portion adhered to a surface of the substrate, and at least a second portion not adhered to the surface of the substrate.

The following are intended to illustrate certain embodiments of the present invention, but do not exemplify the full scope of the invention.

In some embodiments, a method for caging air bags or midsoles (a method involving adhering and printing around) is provided. The method may involve first situating a lasted upper on a multi-axis gantry system. Next, if necessary, the lasted upper may be scanned using a scanner to find a more precise location. This may be followed by printing an initial cage structure onto the lasted upper. Next, polyurethane or another adhesive may be printed at locations where the air bag is to be bonded. An air bag may then be placed onto or inserted into the tacky adhesive region. The surface may then be scanned using a scanner to calibrate positional error in placement of the airbag if necessary. A second cage structure may then be printed to retain the air bag in position with respect to the lasted upper. The airbag may be in a position underneath the lasted upper.

Figure 15:
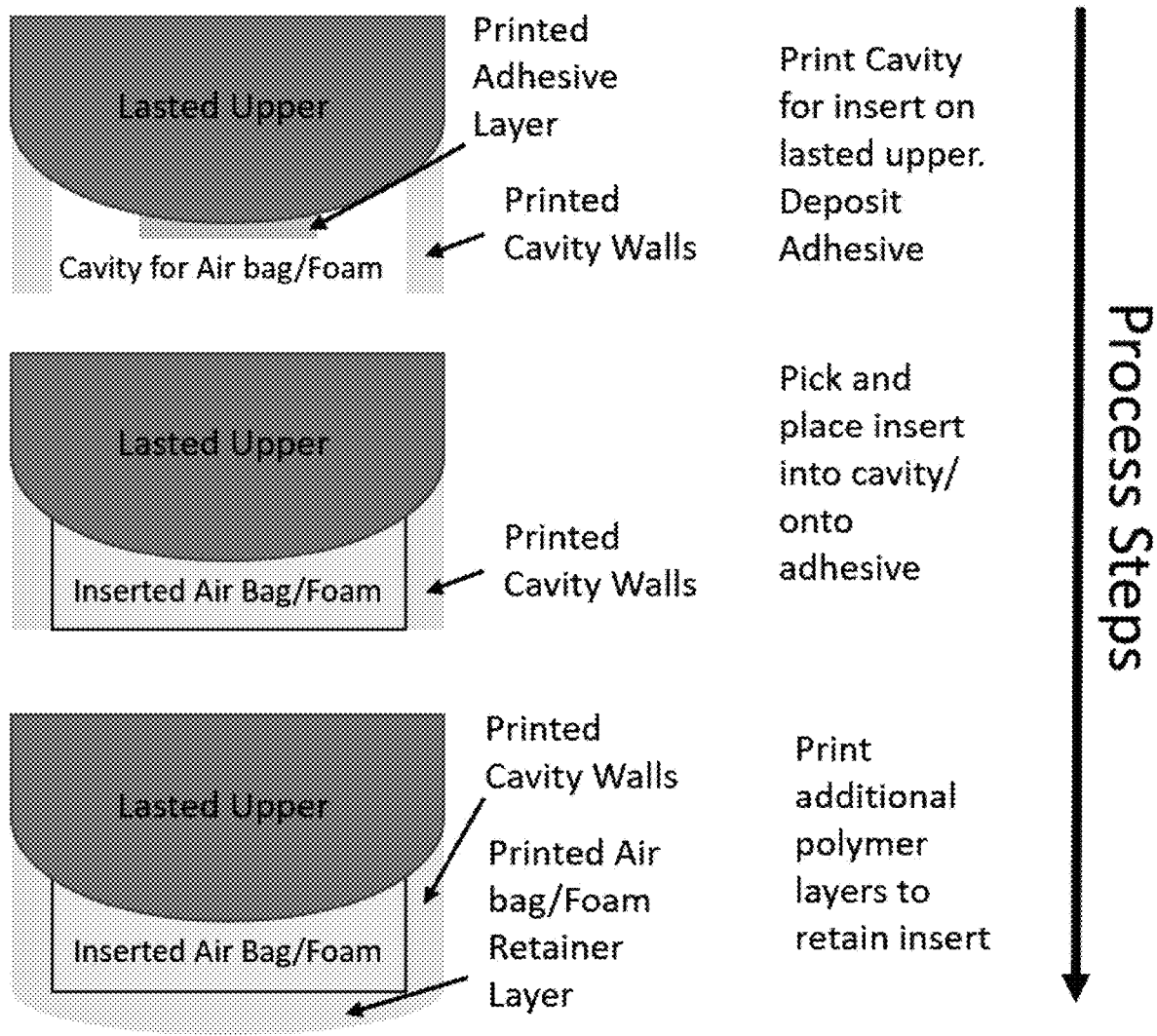
FIG. 15 illustrates a non-limiting example of a process for inserting a gas-containing structure into a cage structure printed onto a lasted upper of an article of footwear, in accordance with some embodiments of the disclosure.

FIG. 15 illustrates a non-limiting process for printing a cavity on a lasted upper, then inserting an air bag into it, in accordance with certain embodiments of the disclosure. An analogous process may also apply to making a midsole without the need to form the midsole directly onto a lasted upper.

Figure 16:
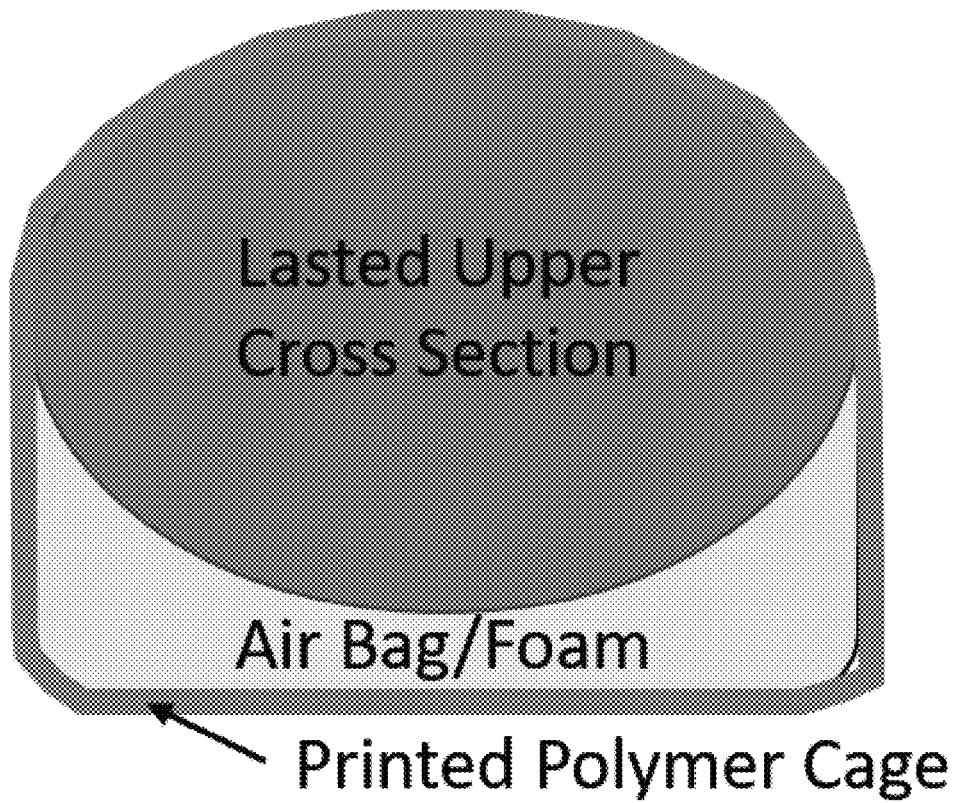
FIG. 16 illustrates a non-limiting example of an article including a lasted upper of an article of footwear, a gas-containing structure, and a polymeric cage structure printed around the lasted upper and gas-containing polymeric structure, in accordance with some embodiments of the disclosure.

FIG. 16 illustrates a printed cage cross section that forms a continuous ring around an upper and air bag or foam, in accordance with certain embodiments of the disclosure.

Figure 17:
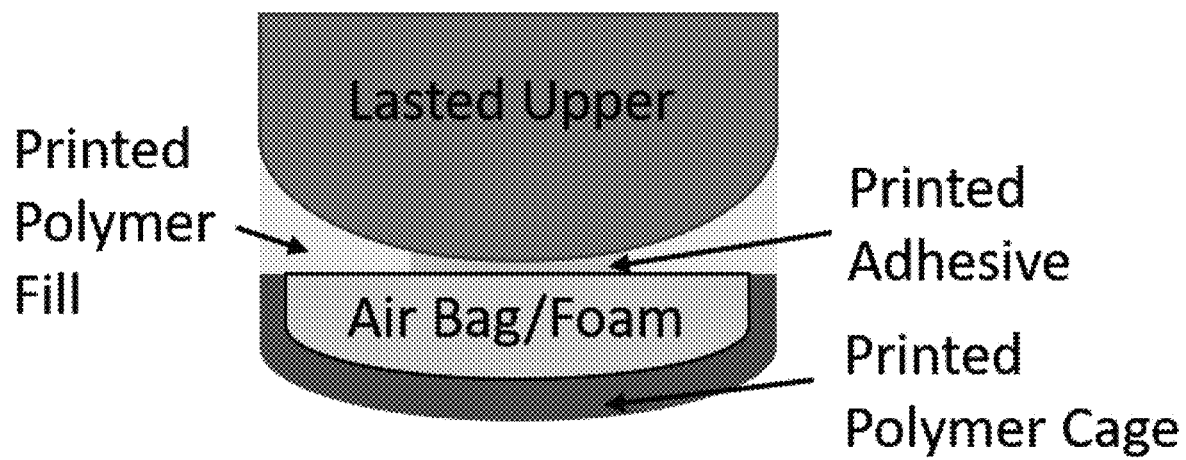
FIG. 17 illustrates a non-limiting example of an article including a lasted upper of an article of footwear onto which both an adhesive and a polymer fill were printed, followed by printing and/or placing a gas-containing polymeric structure and printing a polymer cage structure to enclose the gas-containing structure to the adhesive and polymer fill, in accordance with some embodiments of the disclosure.

FIG. 17 illustrates a method of making an article of footwear comprising a gas-containing polymeric structure, in accordance with certain embodiments of the disclosure. The method may involve printing a base layer on lasted upper, placing an air bag or foam piece on top of it, and then conformally printing a polymer retainer around it.

Figure 18:
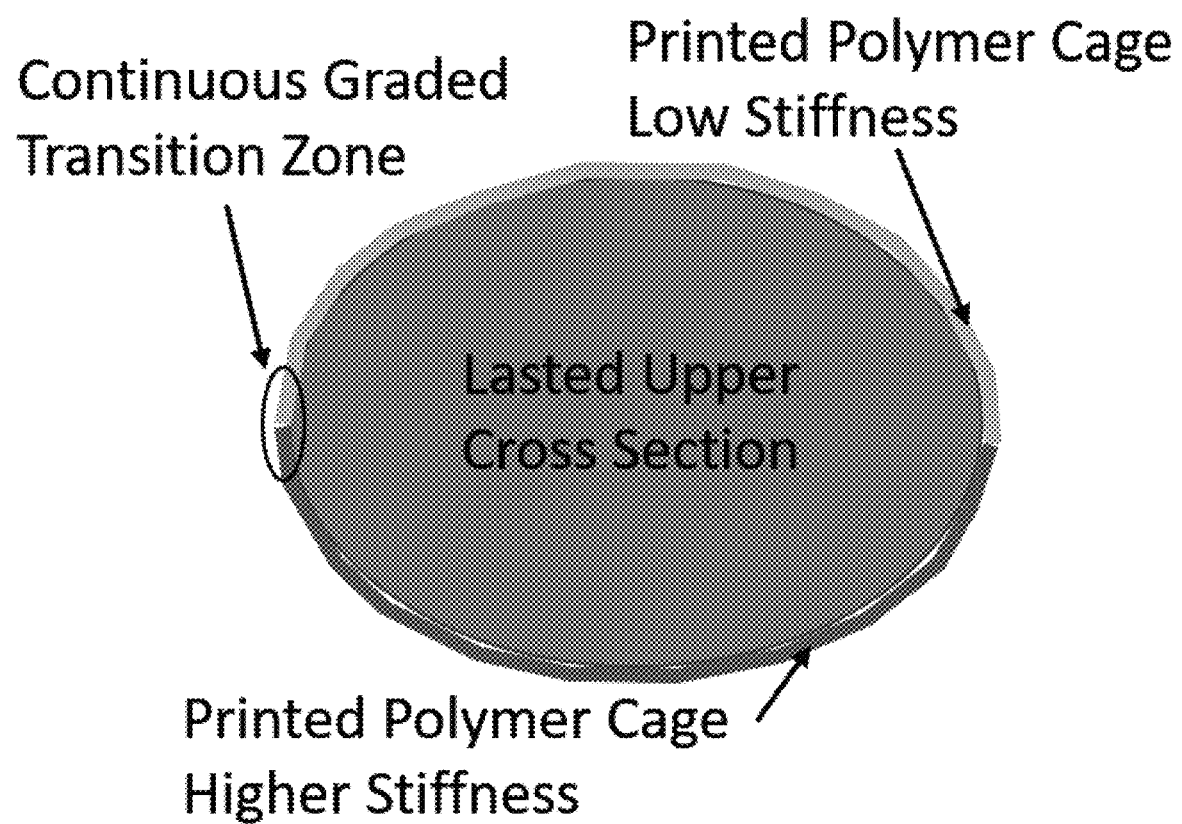
FIG. 18 illustrates a non-limiting example of an article including a lasted upper of an article of footwear onto which a polymer cage structure was printed, comprising a plurality of elongate elements having a higher stiffness, a continuous graded transition zone wherein the stiffness changes continuously from the higher stiffness to a low stiffness, and a plurality of elongate elements having the low stiffness, in accordance with some embodiments of the disclosure.

FIG. 18 illustrates a printed shell around an upper with variable mechanical properties and graded transition zones, in accordance with certain embodiments of the disclosure.

Figure 20:
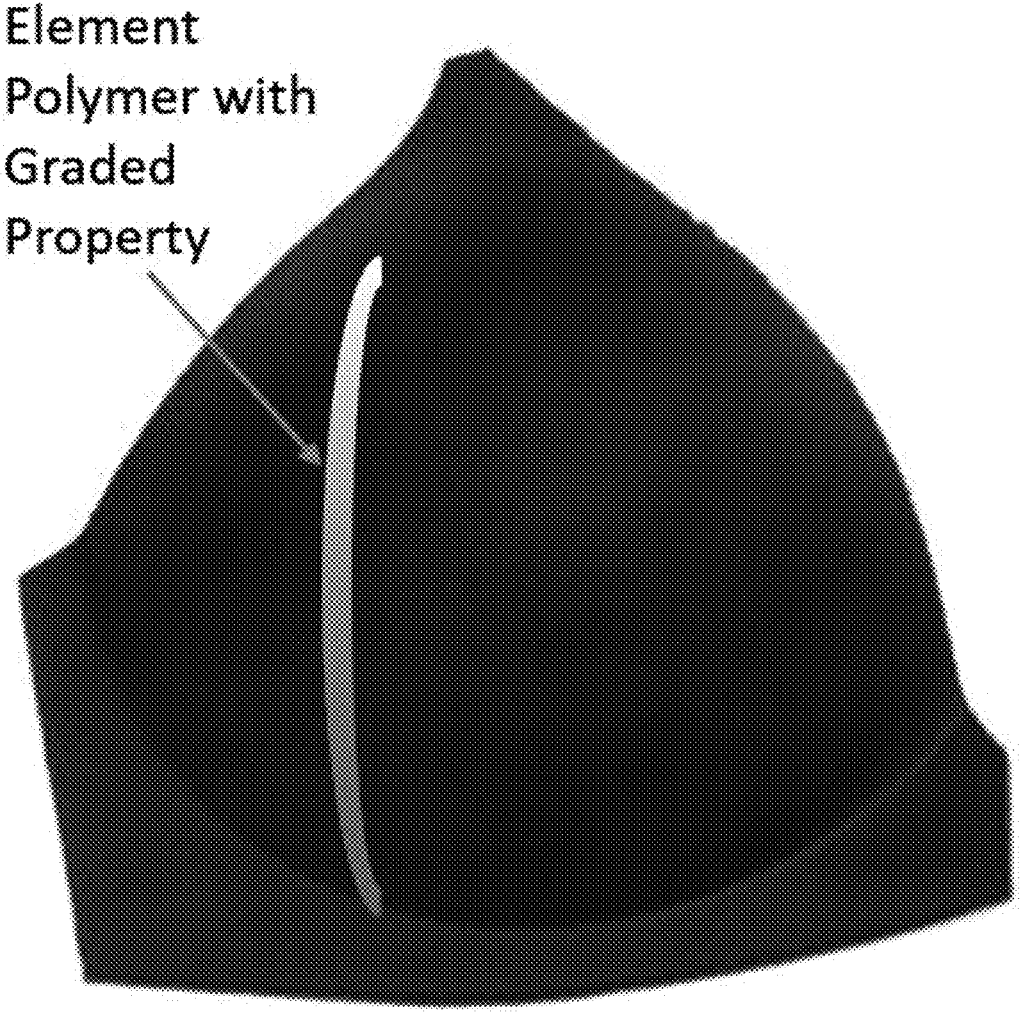
FIG. 20 illustrates a non-limiting example of an article comprising a bra cup having a curved elongate element comprising a gradient in a property (e.g., stiffness, with a stiffer portion near a base of the cup and a softer portion near a top of the cup), in accordance with some embodiments of the disclosure.
Figure 21:
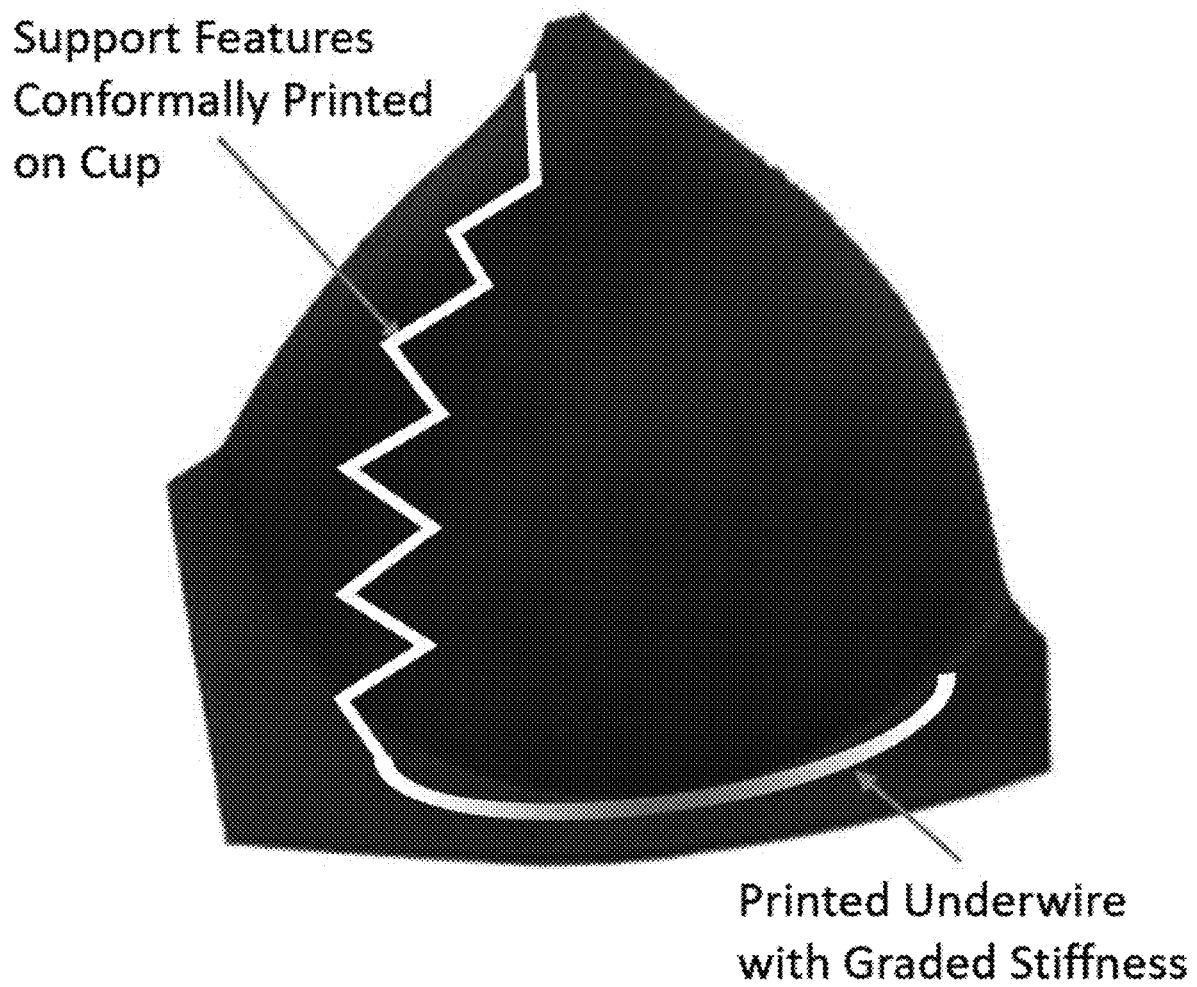
FIG. 21 illustrates a non-limiting example of an article comprising a bra cup having a cage structure comprising support features (e.g., elongate elements), conformally printed onto the cup, and a printed underwire having a gradient in stiffness with a stiffer portion near a center of the underwire and softer portions near ends of the underwire, in accordance with some embodiments of the disclosure.

FIG. 19 illustrates a bra with viscoelastic elements and viscous and/or viscoelastic elements in parallel, in accordance with certain embodiments of the disclosure. FIG. 20 illustrates a bra with printed graded elements, in accordance with certain embodiments of the disclosure. FIG. 21 illustrates a bra with printed underwire and cup support features that are connected via printing, where some of the features (e.g. the underwire) may have graded properties, in accordance with certain embodiments of the disclosure.

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present invention.

In cases where the present specification and a document incorporated by reference include conflicting and/or inconsistent disclosure, the present specification shall control. If two or more documents incorporated by reference include conflicting and/or inconsistent disclosure with respect to each other, then the document having the later effective date shall control.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of."

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

When the word "about" is used herein in reference to a number, it should be understood that still another embodiment of the invention includes that number not modified by the presence of the word "about."

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A method, comprising:
   positioning a textile substrate over a non-planar base having an arc shape;
   printing a material onto the textile substrate to form a cage structure on the textile substrate wherein printing comprises extrusion of the material from a reactive mixing chamber comprising at least two inputs;
   allowing the material to solidify on the textile substrate such that the textile substrate is adhered to the material; and
   removing the substrate from the non-planar base, wherein the elastic modulus of the cage structure is greater than the elastic modulus of the textile substrate and wherein the textile substrate is held in tension and in an arc shape by the cage structure after removing the textile substrate from the non-planar base.

2. The method of claim 1, wherein printing comprises extrusion of the material from one or more nozzles.

3. The method of claim 2, wherein printing comprises modulating a printing tool path and one or more parameters of the one or more nozzles based on feedback from one or more sensors.

4. The method of claim 2, wherein printing comprises maintaining the one or more nozzles at a constant angle relative to the textile substrate normal direction.

5. The method of claim 1, wherein printing comprises rotating and/or translating the nozzle relative to the non-planar base such that the material is extruded spatially normal to the non-planar base.

6. A method, comprising:
   printing a polymeric cage structure directly onto the surface of a textile substrate positioned on a non-planar base having an arc shape,
   wherein printing comprises extrusion of a material from a reactive mixing chamber comprising at least two inputs and through one or more nozzles to form the polymeric structure, and
   removing the textile substrate from the non-planar base,
   wherein the elastic modulus of the cage structure is greater than the elastic modulus of the textile substrate and the textile substrate is held in tension and in an arc shape by the cage structure after removing the textile substrate from the non-planar base.

7. The method of claim 6, comprising bonding the polymeric structure directly to the surface of the textile substrate without the use of an adhesive.

8. The method of claim 6, wherein the surface of the textile substrate has an arc shape during printing of the polymeric structure.

9. The method of claim 6, comprising wrapping the textile substrate around a footwear article last before printing.

* * * * *